(12) United States Patent
Matsudo

(10) Patent No.: US 12,263,773 B2
(45) Date of Patent: Apr. 1, 2025

(54) CONTAINER HOLDER

(71) Applicant: SUBARU CORPORATION, Tokyo (JP)

(72) Inventor: Kento Matsudo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 107 days.

(21) Appl. No.: 18/343,520

(22) Filed: Jun. 28, 2023

(65) Prior Publication Data

US 2024/0017656 A1    Jan. 18, 2024

(30) Foreign Application Priority Data

Jul. 15, 2022    (JP) ................................. 2022-113977

(51) Int. Cl.
*B60N 3/10*    (2006.01)
(52) U.S. Cl.
CPC ................... *B60N 3/106* (2013.01)
(58) Field of Classification Search
CPC ........ B65D 1/265; B65D 35/285; B60N 3/10; B60N 3/101; B60N 3/102; B60N 3/103; B60N 3/104; B60N 3/105; B60N 3/106; B60N 3/107; B60N 3/108
See application file for complete search history.

(56) References Cited

U.S. PATENT DOCUMENTS

| | | | | | |
|---|---|---|---|---|---|
| 4,738,423 | A | * | 4/1988 | DiFilippo | B60N 3/102 248/240.1 |
| 4,759,584 | A | * | 7/1988 | Dykstra | B60N 3/102 297/188.16 |
| 5,135,195 | A | * | 8/1992 | Dane | B60N 3/103 248/314 |
| 5,289,962 | A | * | 3/1994 | Tull | B60N 3/102 224/281 |
| 5,390,887 | A | * | 2/1995 | Campbell | B60N 3/106 248/205.2 |

(Continued)

FOREIGN PATENT DOCUMENTS

| | | |
|---|---|---|
| JP | 2014-198489 A | 10/2014 |
| JP | 6445452 B2 | 12/2018 |

(Continued)

*Primary Examiner* — Kareen K Thomas
(74) *Attorney, Agent, or Firm* — Smith, Gambrell & Russell, LLP

(57) ABSTRACT

A container holder configured to hold a container includes a holder body including a container receiver that contains the container and has an opening and a bottom surface, and a container-holding mechanism that stably holds the container contained in the container receiver. The container-holding mechanism includes a swing member that is swingable around a first support shaft relative to the holder body, a turning member that is turnable around a second support shaft relative to the swing member, and a first biasing member that biases the swing member. In a process of putting or taking the container in or out of the container receiver, an outer surface of the container abuts on a part of an outer surface of the swing member or the turning member, and the swing member swings around the first support shaft or the turning member turns around the second support shaft.

5 Claims, 21 Drawing Sheets

(56) References Cited

U.S. PATENT DOCUMENTS

| | | | | |
|---|---|---|---|---|
| 5,503,297 A | * | 4/1996 | Frankel | B62B 5/06 |
| | | | | 224/558 |
| 5,628,486 A | * | 5/1997 | Rossman | B60N 3/107 |
| | | | | 248/311.2 |
| 5,655,742 A | * | 8/1997 | Whitman | B60N 3/103 |
| | | | | 248/311.2 |
| 2016/0304020 A1 | | 10/2016 | Inoue et al. | |
| 2018/0105089 A1 | | 4/2018 | Inoue et al. | |
| 2019/0023179 A1 | * | 1/2019 | Porcs | B60N 3/108 |
| 2022/0402418 A1 | | 12/2022 | Kondo | |

FOREIGN PATENT DOCUMENTS

| | | |
|---|---|---|
| JP | 2021-059186 A | 4/2021 |
| WO | 2016/178325 A1 | 11/2016 |

* cited by examiner

CONTAINER HOLDER

CROSS-REFERENCE TO RELATED APPLICATIONS

The present application claims priority from Japanese Patent Application No. 2022-113977 filed on Jul. 15, 2022, the entire contents of which are hereby incorporated by reference.

BACKGROUND

The disclosure relates to a container holder to be provided in a vehicle cabin of a vehicle, such as an automobile, the container holder for holding and containing a drink container or the like.

Current vehicles, such as automobiles, are provided with container holders that are called "cup holders", "bottle holders", and so on (hereinafter simply referred to as "container holders"). The container holder is used to contain and place a drink container or the like, which is taken in a vehicle cabin by an occupant or another person. The drink container may be a cup or a bottle filled with a drink.

Various types of container holders have been developed, and some are already commercially practical. These container holders have a mechanism for stably holding a drink container or the like even when a vehicle is traveling.

In one example, container holders that are disclosed in Japanese Patent No. 6445452 and WO 2016/178325 include a container-holding mechanism that uses rollers having a rotation axis extending in a direction tangent to a circle around a center axis of a container receiver.

In this type of container-holding mechanism using rollers, multiple rollers are arranged so as to surround the container receiver. These rollers are biased to a radial inside of the container receiver and are thereby movable in a radial direction of the container receiver. With such structure, the rollers stably hold a drink container or the like contained in the container receiver.

In another example, container holders that are disclosed in Japanese Unexamined Patent Applications Publication Nos. 2021-59186 and 2014-198489 include a container-holding mechanism using arm members or swing members that protrude in an approximately circular arc shape, to a radial inside of a container receiver. These arm members or these swing members are biased to the radial inside of the container receiver by biasing members. With this structure, the arm members or the swing members stably hold a drink container or the like contained in the container receiver.

Meanwhile, among drink containers or the like that are generally widespread in recent years, in particular, bottle-shaped drink containers made of synthetic resin, called "PET bottles" or "plastic bottles", have various dimensions (e.g., volume, diameter, height, and other outer shape dimensions) and shapes (e.g., a shape obtained by providing each type of design, such as a protrusion and a recess, on an outer surface).

SUMMARY

An aspect of the disclosure provides a container holder configured to hold a container. The container holder includes a holder body and a container-holding mechanism. The holder body includes a container receiver configured to contain the container. The container receiver has an opening at an upper surface and includes a bottom surface. The container-holding mechanism is configured to stably hold the container that is contained in the container receiver. The container-holding mechanism includes a swing member, a turning member, and a first biasing member. The swing member is swingable around a first support shaft relative to the holder body. The turning member is turnable around a second support shaft relative to the swing member. The first biasing member is configured to bias the swing member in a direction protruding to a radial inside of the container receiver. An outer surface of the container is configured to, in a process of putting or taking the container in or out of the container receiver, abut on a part of an outer surface of the swing member or a part of an outer surface of the turning member, and the swing member is configured to swing around the first support shaft or the turning member turns around the second support shaft.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

DETAILED DESCRIPTION

Unfortunately, container holders having existing configurations, as disclosed in the above-described patent publications and so on, may not be suitable for some types of drink containers and the like having different dimensions and shapes.

For example, drink containers may have a protrusion and a recess on an outer surface, and in particular, some drink containers and the like may have a greatly constricted shape (a recessed surface). In taking such a drink container out of a container receiver, a part of a container-holding mechanism, such as a roller, an arm member, or a swing member may catch a protrusion-and-recess part on an outer surface of the drink container.

Although a drink container is not smoothly taken out, as described above, a user can take out the drink container by doing a few actions such as changing the position or the pulling-out direction of the drink container that is being taken out. These additional minute operations can put a user under unnecessary stress.

It is desirable to provide a container holder suitable for various types of drink containers and the like having different dimensions and shapes and configured to contain and continuously stably hold a drink container or the like and to allow easily and smoothly putting in and taking out each type of drink container or the like in single operation.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. First Embodiment FIGS. 1 to 11 illustrate a first embodiment of the disclosure. Among them, FIGS. 1 to 5 illustrate a configuration of the first embodiment of the disclosure. FIGS. 6 to 11 illustrate actions of the first embodiment of the disclosure.

Figure 1:
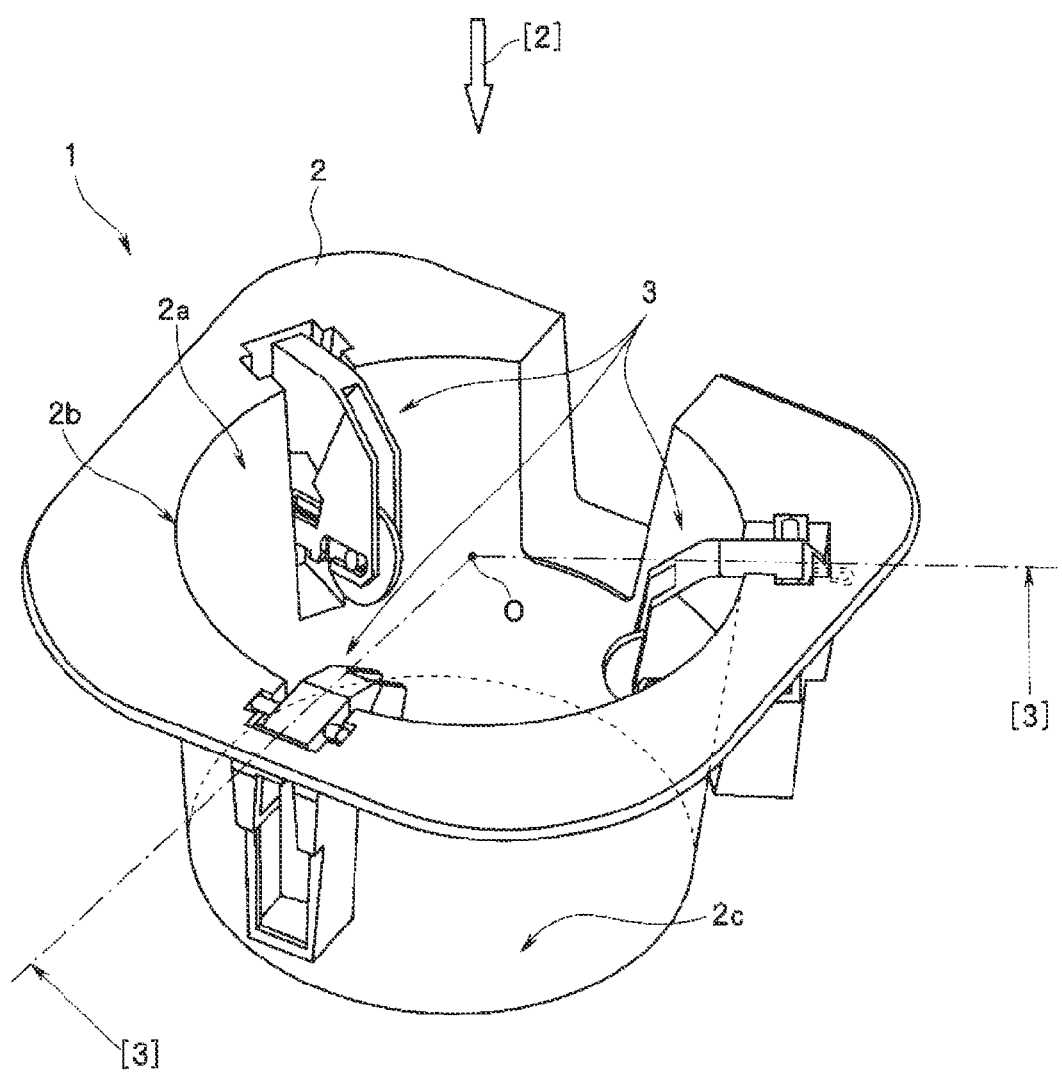
FIG. 1 is an external perspective view illustrating a schematic configuration of a container holder of an embodiment of the disclosure.
Figure 2:
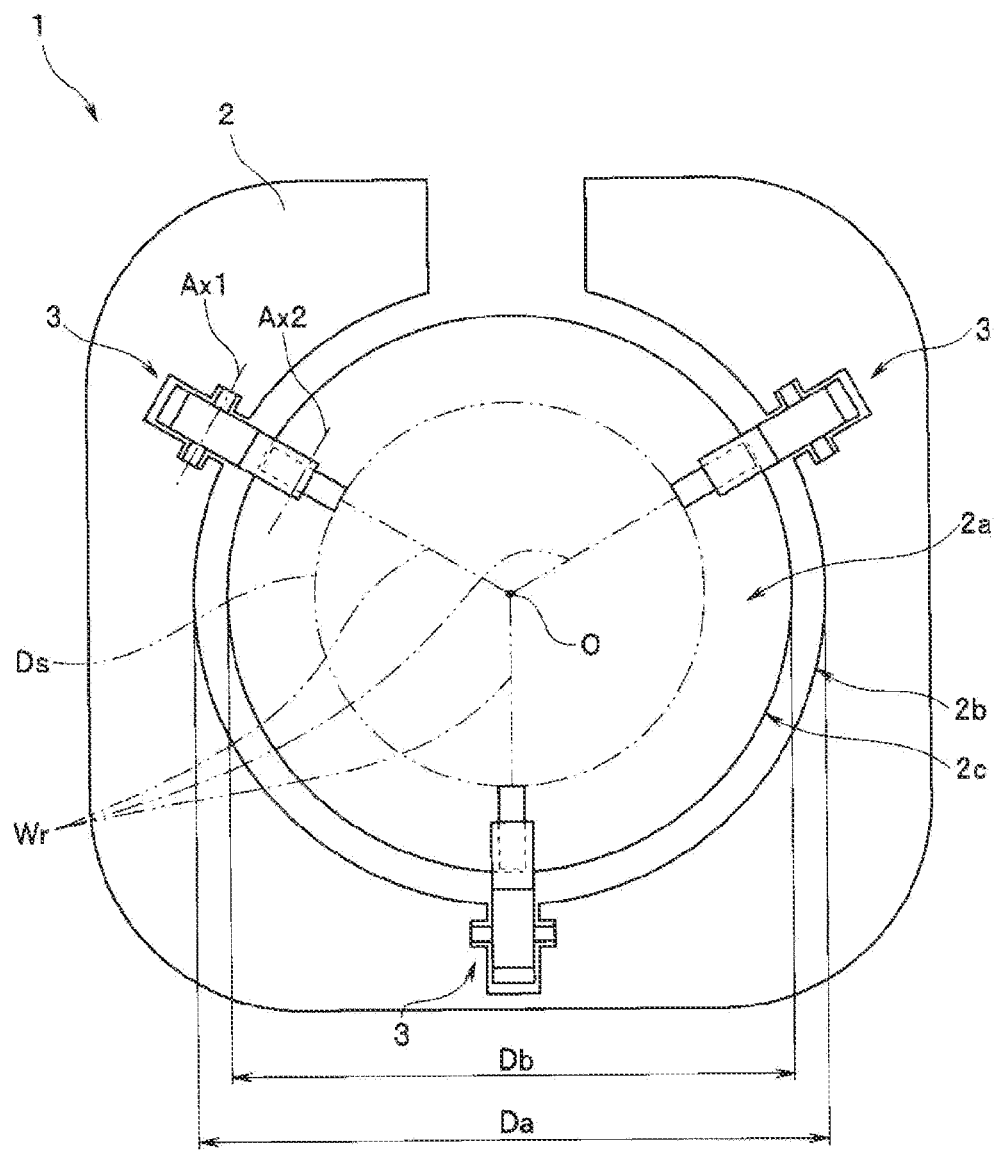
FIG. 2 is a schematic top view as seen from a direction indicated by an arrow with a reference symbol [2] in FIG. 1.
Figure 3:
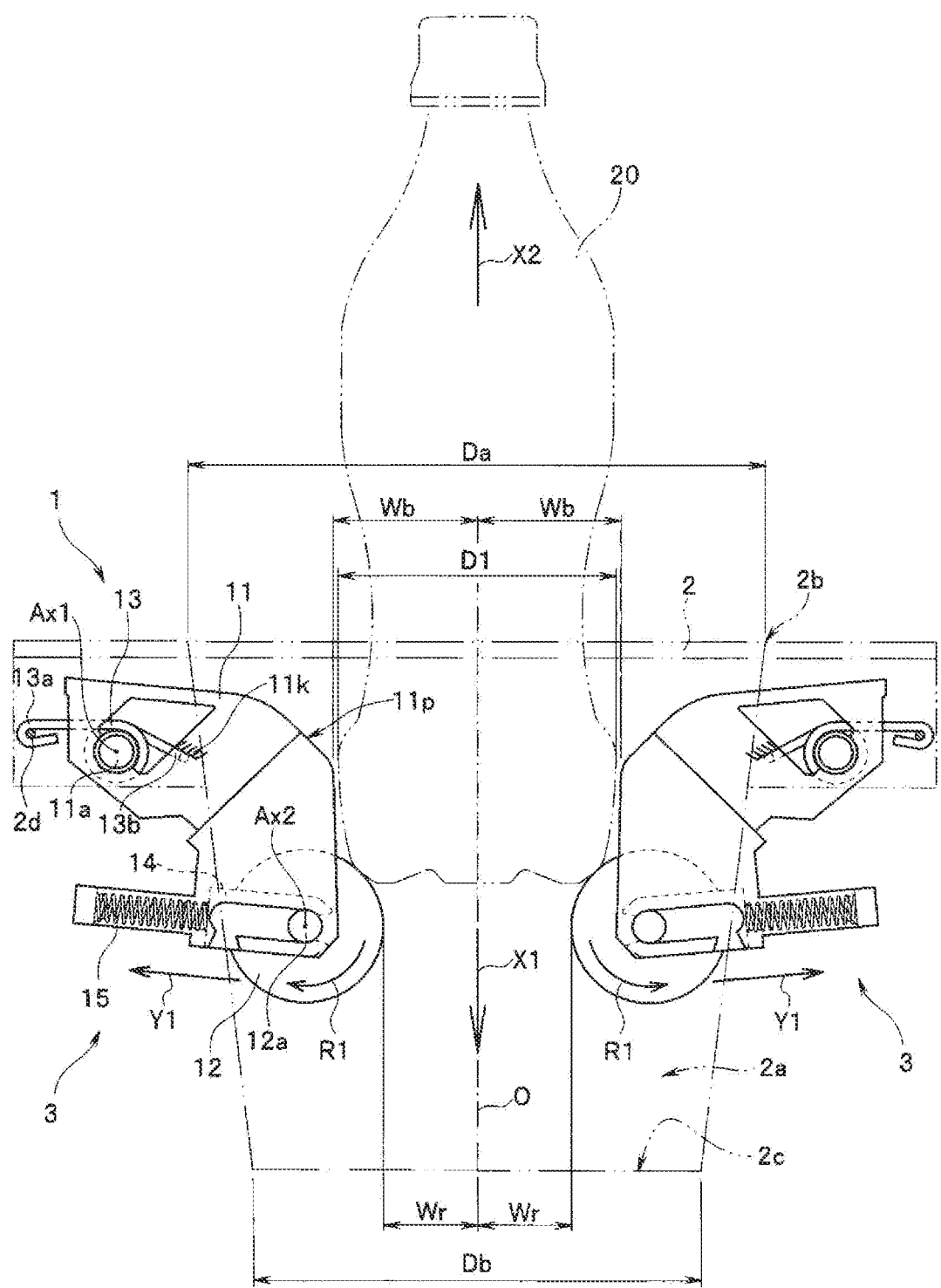
FIG. 3 is a schematic sectional view along a line [3]-[3] in FIG. 1.
Figure 4:
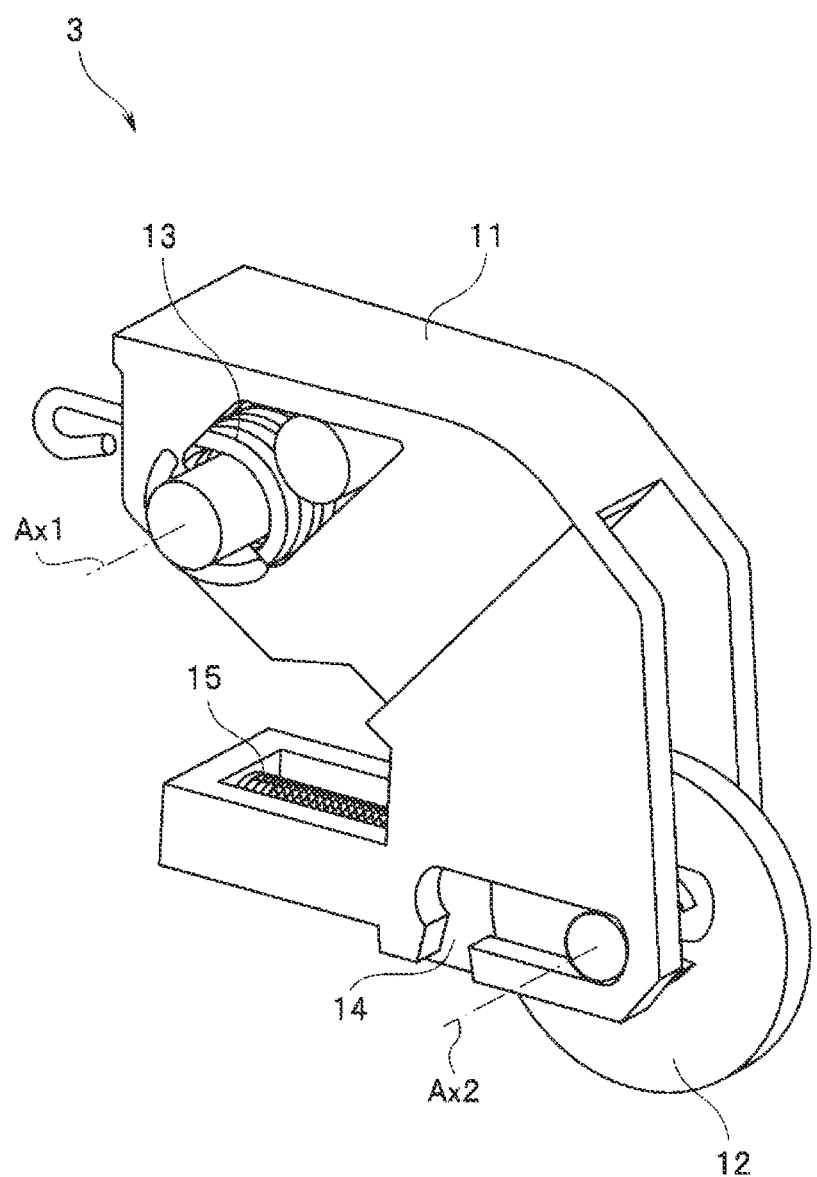
FIG. 4 is an external perspective view illustrating one of container-holding mechanisms that is extracted from the container holder in FIG. 1.
Figure 5:
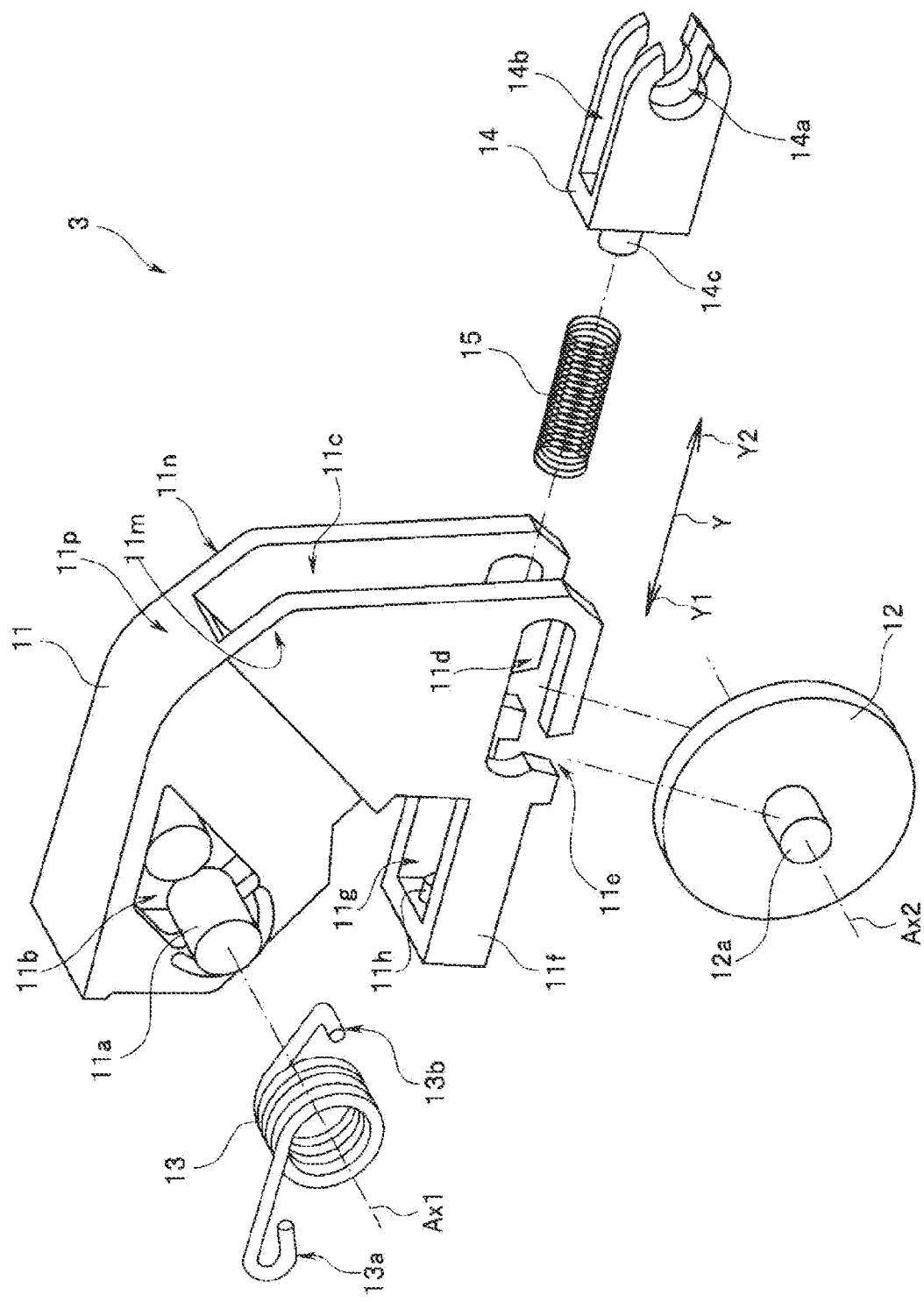
FIG. 5 is an exploded perspective view of the container-holding mechanism illustrated in FIG. 4.

First, a configuration of a container holder of the first embodiment of the disclosure will be described by using FIGS. 1 to 5, hereinafter. FIG. 1 is an external perspective view illustrating a schematic configuration of a container holder of a first embodiment of the disclosure. FIG. 2 is a schematic top view as seen from a direction indicated by an arrow with a reference symbol [2] in FIG. 1. FIG. 3 is a schematic sectional view along a line [3]-[3] in FIG. 1. FIG. 4 is an external perspective view illustrating one of container-holding mechanisms that is extracted from the container holder illustrated in FIG. 1. FIG. 5 is an exploded perspective view of the container-holding mechanism illustrated in FIG. 4. FIGS. 1 to 4 illustrate the container-holding mechanism in an unloaded state.

As illustrated in FIG. 1 and other drawings, a container holder 1 of this embodiment is composed mainly of a holder body 2 and multiple container-holding mechanisms 3.

The holder body 2 is formed with a container receiver 2a for containing, for example, a bottle-shaped drink container (refer to the reference symbol 20 in FIG. 3 and other drawings; hereinafter referred to as a "drink container 20"). The container receiver 2a has an opening 2b at an upper surface and a floor surface 2c at a bottom surface. The container receiver 2a illustrated in this embodiment is, for example, formed into an approximately circular shape at the opening 2b and at the floor surface 2c, thereby forming an approximately columnar space as a whole. However, the shape of the container receiver 2a is not limited to the structure of this example.

The container receiver 2a is desirably formed so that a diameter Db of the floor surface 2c at the bottom surface will be slightly smaller than a diameter Da of the opening 2b at the upper surface (Da>Db), as illustrated in FIGS. 2 and 3 and other drawings.

The container-holding mechanism 3 is a mechanism unit for stably holding a drink container 20 that is contained in the container receiver 2a. Multiple container-holding mechanisms 3 are arranged so as to surround the container receiver 2a. In the container holder 1 of this embodiment, as illustrated in, for example, FIG. 2, three container-holding mechanisms 3 are arranged at respective positions at approximately equal intervals (e.g., 120-degree intervals) around a center axis O of the opening 2b of the container receiver 2a. The number of the arranged container-holding mechanisms 3 is not limited to that illustrated in this embodiment. However, it is desirable to arrange at least three container-holding mechanisms 3 to one container holder 1.

A circle Ds that is illustrated by a two-dot chain line in FIG. 2 shows an approximation of a minimum diameter of a drink container that can be stably held in the container receiver 2a by using the three container-holding mechanisms 3 of the container holder 1.

In addition, a straight line Wr that is illustrated by a two-dot chain line in FIG. 2 shows a distance of a straight line connecting a part present on the innermost side in the container receiver 2a among constituent members of one container-holding mechanism 3 (an outer circumferential part of a roller 12 in this example) and the center axis O of the opening 2b, when the container holder 1 is in the initial state (described later).

In other words, the reference symbol Wr illustrated in FIG. 2 shows a radius of a drink container having a diameter Ds. FIG. 3 illustrates two-dot chain lines with a reference symbol 20, which represents an example of one embodiment of a drink container.

Next, details of the structure of the container-holding mechanism 3 in the container holder 1 of this embodiment will be described hereinafter. As illustrated in FIGS. 4 and 5 and other drawings, the container-holding mechanism 3 is composed mainly of a body 11, a roller 12, a helical torsion spring 13, a roller-pressing member 14, and a roller-biasing spring 15.

The body 11 is a swing member that is swingably disposed to the holder body 2. The body 11 is a block member that has an approximately L-shaped flat surface as a whole and that is formed into a flat plate shape.

The body 11 is formed with a first support shaft 11a (refer to FIG. 5) in an area close to an end of one arm. The first support shaft 11a is a shaft part that axially supports the body 11 such that the body 11 is swingable relative to the holder body 2. The first support shaft 11a has a center axis Ax1 that is approximately parallel to a tangential line of the circle (refer to FIG. 2) around the center axis O of the opening 2b.

The helical torsion spring 13 is wound around to be disposed to the first support shaft 11a. For this purpose, the body 11 is formed with a spring placement part 11b (refer to FIG. 5) in the vicinity of the first support shaft 11a.

The helical torsion spring 13 is a first biasing member that limits an end of a swing range of the body 11 as well as generates a biasing force for biasing the body 11 in a predetermined swing direction. For this purpose, one arm 13a of the helical torsion spring 13 is hooked to a predetermined fixing part 2d of the holder body 2, as illustrated in FIG. 3. The other arm 13b of the helical torsion spring 13 is engaged with a predetermined fixing part 11k of the body 11. With this structure, swing around the center axis Ax1 of the first support shaft 11a of the body 11 is limited in a predetermined range by the helical torsion spring 13. In addition, the body 11 is biased in a predetermined direction (a radially inward direction of the opening 2b of the container receiver 2a) around the center axis Ax1 of the first support shaft 11a by the biasing force of the helical torsion spring 13.

FIGS. 1 to 4 illustrate the helical torsion spring 13 in the initial state with no load applied. In this state, the body 11 remains in the state illustrated in FIG. 3.

Meanwhile, the roller 12 is disposed in an area close to an end of the other arm of the body 11. The roller 12 is a turning member that is rollably disposed to the body 11. The roller 12 is formed into an approximately flat disc shape as a whole.

The roller 12 has a second support shaft 12a. The second support shaft 12a is a shaft part that axially supports the roller 12 such that the roller 12 is rotatable relative to the body 11. For this purpose, the second support shaft 12a has a center axis Ax2 that is disposed at a position approximately coinciding with a center axis of the roller 12.

As in the case of the first support shaft 11a, the center axis Ax2 of the second support shaft 12a is approximately parallel to a tangential line of the circle (refer to FIG. 2) around the center axis O of the opening 2b. That is, the center axis Ax1 of the first support shaft 11a and the center axis Ax2 of the second support shaft 12a are approximately parallel to each other.

Although details will be described later, the second support shaft 12a is axially supported by a through hole 14a of the roller-pressing member 14 in a rotatable manner.

the other arm of the body 11 has a space area 11c that is formed between outer surfaces 11m and 11n. The space area 11c is a space formed in order to dispose the disc part of the roller 12 and enable the roller 12 to rotate smoothly.

Moreover, the area close to the end of the other arm of the body 11 is formed with an oblong through hole 11d for guiding movement of the second support shaft 12a of the roller 12 in a predetermined direction. The oblong through hole 11d penetrates through the body 11 in a direction along the center axis Ax2 of the second support shaft 12a and is formed into an oblong hole shape extending in a predetermined direction orthogonal to the center axis Ax2 of the second support shaft 12a. In this case, the oblong through hole 11d extends in a direction along the radial direction of the container receiver 2a (opening 2b) (that is, a direction along an arrow Y in FIG. 5).

The oblong through hole 11d is partially formed with a through path 11e that opens to the outside of the body 11. The through path 11e is an attaching path for introducing the second support shaft 12a of the roller 12 into the oblong through hole 11d.

Meanwhile, the area close to the end of the other arm of the body 11 is formed with an extended part 11f that extends in parallel to the extending direction (arrow Y direction) of the oblong through hole 11d and in the same direction as the extending direction of the one arm of the body 11.

The extended part 11f is formed into an approximately box shape having an internal space 11g. The internal space 11g of the extended part 11f communicates with the space area 11c inside the body 11. The internal space 11g is a space for containing the roller-pressing member 14 and the roller-biasing spring 15.

The roller-pressing member 14 is a pressing support member that moves the roller 12 in the radial direction (Y direction) of the container receiver 2a (opening 2b) while axially supporting the second support shaft 12a of the roller 12 in a rotatable manner. The roller-pressing member 14 is formed with the through hole 14a in the vicinity of an end. The second support shaft 12a is inserted through the through hole 14a. Thus, the roller 12 is axially supported so as to be rotatable relative to the roller-pressing member 14.

The roller-pressing member 14 is also formed with a roller rotation space 14b that is a space area for allowing the roller 12 to rotate smoothly. The roller rotation space 14b is formed into a shape approximately the same as that of the space area 11c of the body 11.

Moreover, the roller-pressing member 14 is formed with a spring-receiving part 14c for receiving a leading end of the roller-biasing spring 15, at a rear end surface. The spring-receiving part 14c engages with the leading end of the roller-biasing spring 15. With this structure, the spring-receiving part 14c fixes an end of the roller-biasing spring 15 to inhibit a position deviation of the roller-biasing spring 15.

The roller-biasing spring 15 is a second biasing member that biases the roller-pressing member 14 in the radially inward direction of the container receiver 2a (opening 2b). A biasing member such as a coil spring, which contracts and extends in the direction along the arrow Y in FIG. 5, is used as the roller-biasing spring 15.

For this purpose, the roller-biasing spring 15 is disposed in the internal space 11g in such a manner that the leading end is wound around the spring-receiving part 14c of the roller-pressing member 14 to be approximately fixed, whereas a trailing end is wound around a spring-receiving part 11h of the body 11 to be approximately fixed.

The body 11 is also formed with a sloped surface 11p in the vicinity of a part coupling the one arm and the other arm. As illustrated in FIG. 3, the sloped surface 11p extends from the vicinity of a rim part of the opening 2b of the container receiver 2a to the radial inside of the opening 2b and extends toward the bottom surface, in the state in which the container-holding mechanism 3 is mounted to the holder body 2. The sloped surface 11p is formed into an approximately circular arc shape. In addition, the sloped surface 11p does not have a step or the like and is coupled by a smooth flat surface, at the part coupling the one arm and the other arm.

The container-holding mechanism 3 having such a structure is assembled as follows. First, the roller-biasing spring 15 is inserted into the internal space 11g of the body 11. At this time, the trailing end of the roller-biasing spring 15 is approximately fixed to the spring-receiving part 11h of the body 11.

Next, the roller-pressing member 14 is inserted into the internal space 11g of the body 11. At this time, the leading end of the roller-biasing spring 15 is approximately fixed to the spring-receiving part 14c of the roller-pressing member 14.

Subsequently, the roller-pressing member 14 is pressed rearward (an arrow Y1 direction in FIG. 5) against the biasing force of the roller-biasing spring 15 in the internal space 11g, and while this state is maintained, the second support shaft 12a of the roller 12 is inserted from the through path 11e into the oblong through hole 11d of the body 11.

Then, the second support shaft 12a is fitted into the through hole 14a of the roller-pressing member 14. The state of pressing the roller-pressing member 14 is then released, whereby the roller-pressing member 14 is pushed forward (an arrow Y2 direction in FIG. 5) by the biasing force of the roller-biasing spring 15.

In response to this, the second support shaft 12a moves along the oblong through hole 11d and comes into contact with a leading end inner surface of the oblong through hole 11d. This causes the roller 12 to be positioned at a predetermined position in the body 11. In this state, the roller 12 is continuously applied with a slight biasing force in the arrow Y2 direction of the roller-biasing spring 15. Thus, the predetermined position of the roller 12, as illustrated in FIG. 4 and other drawings, is maintained relative to the body 11.

With this structure, the roller-pressing member 14 and the roller 12 are continuously biased in the predetermined direction by the biasing force of the roller-biasing spring 15. The predetermined direction in this case is the arrow Y2 direction in which the roller-pressing member 14 and the roller 12 are directed to the radial inside of the opening 2b of the container receiver 2a.

Under these conditions, the roller 12 freely goes backward and forward along the direction along the oblong through hole 11d (arrow Y direction) against the biasing force of the roller-biasing spring 15, in response to an outer circumferential surface of the roller 12 being applied with an external force in the arrow Y1 direction. In addition, the roller 12 in this state is rotatable around the center axis Ax2 of the second support shaft 12a.

The component unit having the roller 12 that is thus incorporated into the body 11 is assembled to the holder body 2. In this case, the helical torsion spring 13 is wound around the first support shaft 11a and is disposed inside the spring placement part 1ib. Then, the one arm 13a of the helical torsion spring 13 is hooked to the fixing part 2d of the holder body 2. The other arm 13b of the helical torsion spring 13 is engaged with the fixing part 11k of the body 11. In this manner, mounting the container-holding mechanism 3 to a predetermined position of the holder body 2 is completed.

Next, actions of the container holder 1 of this embodiment will be described by using FIGS. 3 and 6 to 11, hereinafter. The actions described below are performed in putting and taking each type of drink container in and out of the container holder 1 of this embodiment.

First, actions in putting and taking a first type drink container 20 in and out of the container holder 1 of this embodiment will be described by using FIGS. 3 and 6 to 8.

FIG. 3 illustrates the initial state of the container holder 1 of this embodiment. The following focuses on actions in putting the drink container 20 indicated by the two-dot chain lines in the container receiver 2a of the container holder 1 in this state.

The first type drink container 20 has a general size (e.g., volume of around 500 ml) and is an embodiment of a bottle-shaped drink container with a protrusion and a recess on an outer surface. The maximum diameter of the drink container 20 is denoted by a reference symbol D1, as illustrated in FIG. 3. Herein, the maximum diameter D1 of the drink container 20 is assumed to be, for example, approximately equal to the diameter of a bottom surface of the drink container 20, as illustrated in FIG. 3.

Meanwhile, the distance between the rollers 12 of the container-holding mechanisms 3 in the initial state in the container holder 1 is represented by "Wr×2", as illustrated in FIG. 3. The distance between the bodies 11 of the container-holding mechanisms 3 in the initial state is represented by "Wb×2", as illustrated in FIG. 3.

Herein, it is assumed that the maximum diameter D1 of the drink container 20 is larger than the distance between the rollers 12 of the container-holding mechanisms 3 (Wr×2) and is approximately equal to or smaller than the distance between the bodies 11 of the container-holding mechanisms 3 (Wb×2). That is, it is assumed that the following relationship holds:

$$(Wb \times 2) \geq D1 > (Wr \times 2)$$

First, as illustrated in FIG. 3, the drink container 20 is put from the opening 2b of the holder body 2 into the container holder 1 that is in the initial state, in the direction along an arrow X1. At this time, due to the dimensions of the drink container 20 and the container holder 1 having a relationship of the above-described formula, an outer surface close to the bottom surface of the drink container 20 abuts on the outer circumferential surfaces of the rollers 12.

Although the example illustrated in FIG. 3 and other drawings shows a situation of putting the drink container 20 into the container receiver 2a of the container holder 1 in the arrow X1 direction, which is a perpendicular direction, the insertion direction is not limited thereto.

Mostly, the drink container 20 is put in the container receiver 2a of the container holder 1 by inserting the drink container 20 in an insertion direction oblique to the plane of the opening 2b. However, movements of the elements in such a situation can be explained by the following descriptions of actions.

When the drink container 20 is continuously inserted in the same arrow X1 direction into the container holder 1, the rollers 12 are pressed by the outer surface of the drink container 20 and start rotating around the center axis Ax2 of the second support shaft 12a, in an arrow R1 direction in FIG. 3.

As the drink container 20 is further inserted in the arrow X1 direction, the rollers 12 are pressed in an arrow Y1 direction in FIG. 3 while continuously rotating in the arrow R1 direction. Thus, the roller 12 and the roller-pressing member 14 move in the arrow Y1 direction in FIG. 3, against the biasing force of the roller-biasing spring 15. Then, the container holder 1 and the drink container 20 come to the positions illustrated in FIG. 6.

Figure 6:
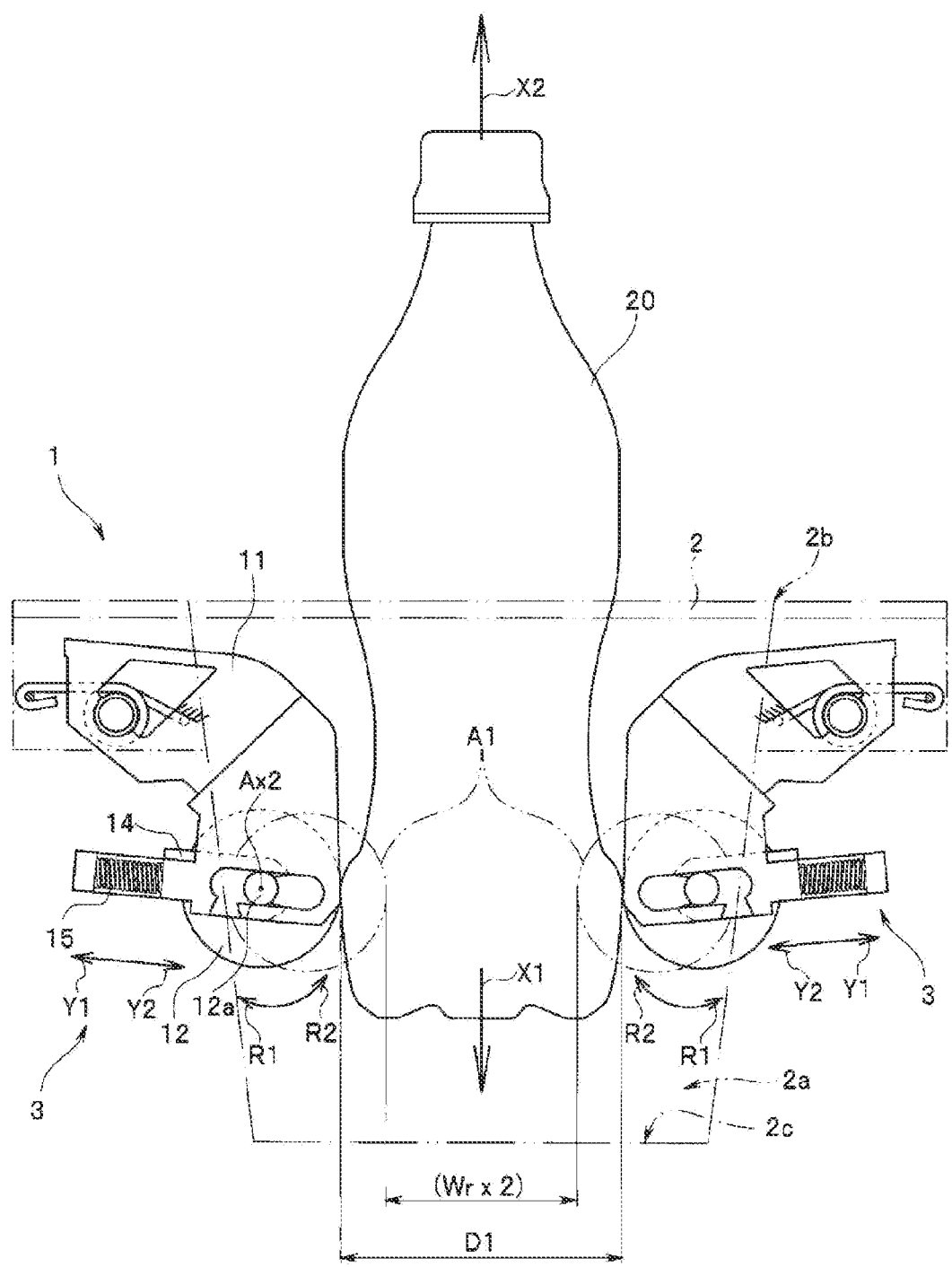
FIG. 6 illustrates a state during putting a first type drink container in the container holder of the embodiment of the disclosure.

FIG. 6 illustrates a state following the state in FIG. 3. FIG. 6 illustrates the roller 12 abutting on a maximum diameter part of the drink container 20. The reference symbol A1 in FIG. 6 indicates imaginary lines showing the initial positions of the rollers 12 (roller positions in FIG. 3).

When the drink container 20 in the state in FIG. 6 is further inserted in the arrow X1 direction, the rollers 12 move along the outer surface of the drink container 20 while rotating in the arrow R1 direction. At this time, each roller 12 is pressed to the outer surface of the drink container 20 by the biasing force of the roller-biasing spring 15. Thus, the rollers 12 move along a constricted part while continuously abutting on the outer surface of the drink container 20. In addition, each roller 12 also moves in the arrow Y2 direction in FIG. 6. Then, the container holder 1 and the drink container 20 come to the positions illustrated in FIG. 7.

Figure 7:
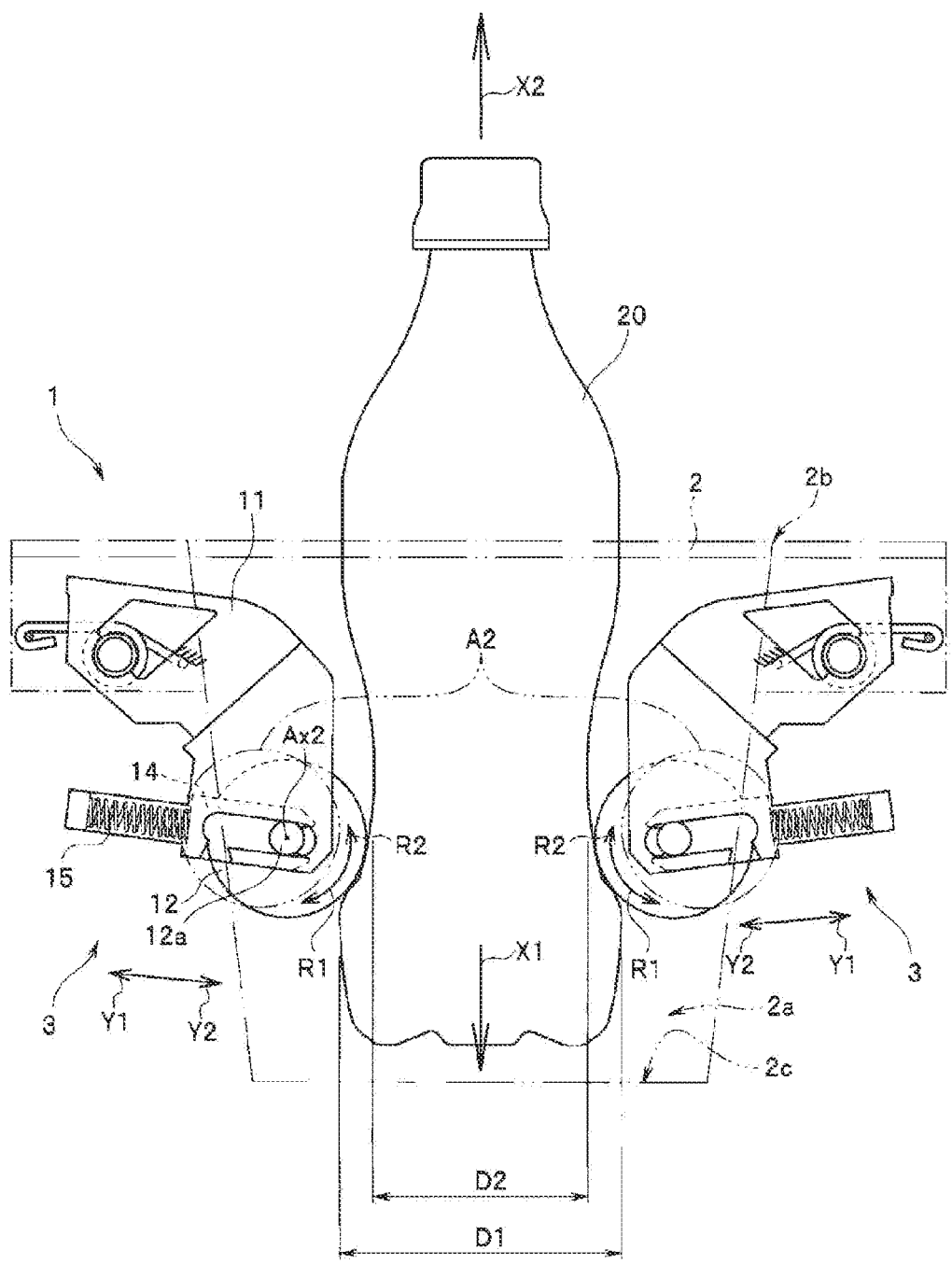
FIG. 7 illustrates a state following the state in FIG. 6.

FIG. 7 illustrates a state following the state in FIG. 6. FIG. 7 illustrates the roller 12 abutting on the constricted part on the outer surface of the drink container 20. The reference symbol D2 in FIG. 7 indicates a diameter of the narrow part of the constricted part on the outer surface of the drink container 20. In addition, the reference symbol A2 in FIG. 7 indicates imaginary lines showing the roller positions in FIG. 6.

When the drink container 20 in the state in FIG. 7 is further inserted in the arrow X1 direction, the rollers 12 move in contact with and along the outer surface of the drink container 20 and also move in the arrow Y2 direction in FIG. 7, while continuously rotating in the arrow R1 direction. Then, the container holder 1 and the drink container 20 soon come to the positions illustrated in FIG. 8.

Figure 8:
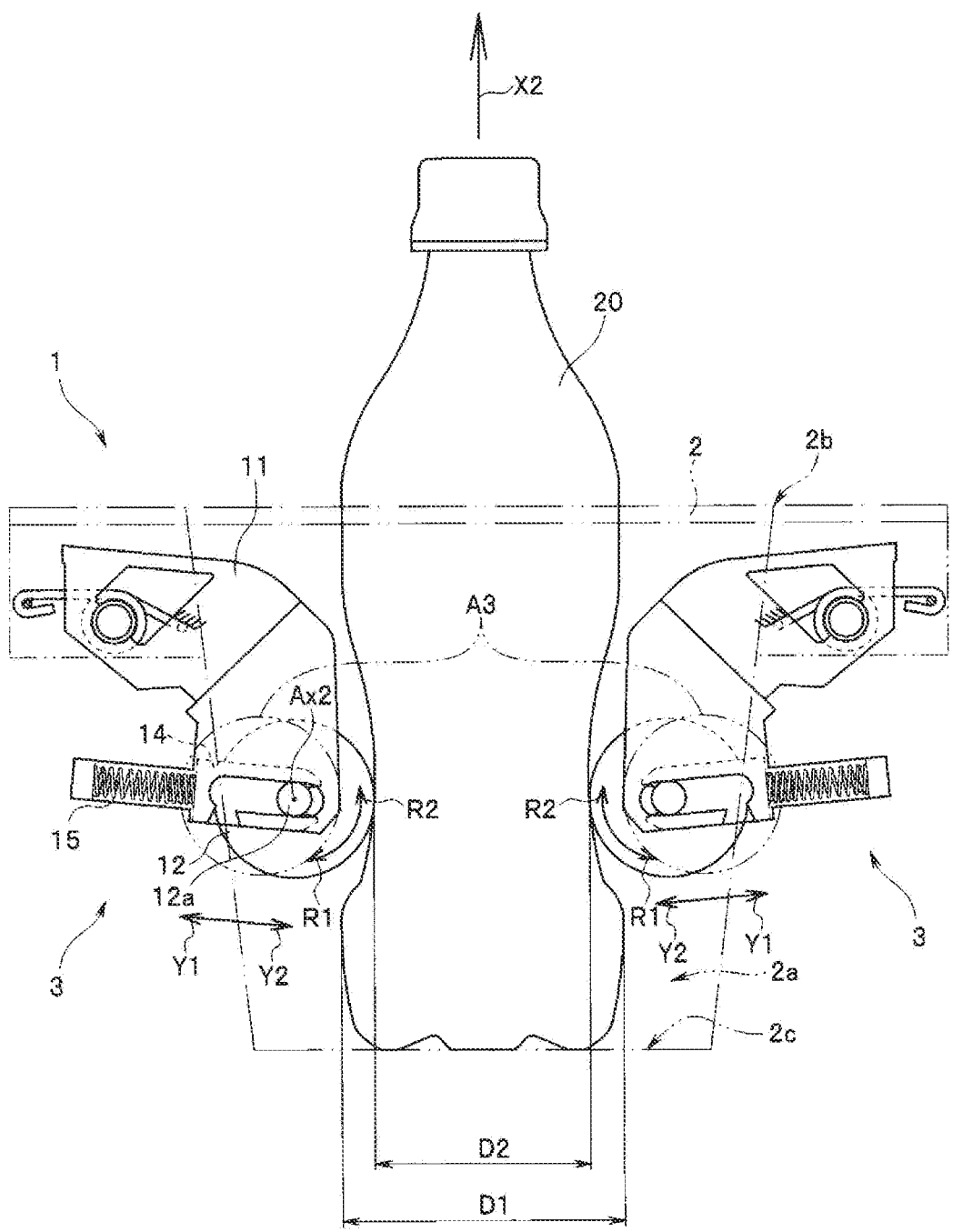
FIG. 8 illustrates a state in which the drink container is completely contained in the container holder, following the state in FIG. 7.

FIG. 8 illustrates a state in which the drink container 20 is completely contained in the container holder 1, following the state in FIG. 7. FIG. 8 illustrates the roller 12 abutting on a certain part (narrow part of the constricted part) on the outer surface of the drink container 20 to stably hold the drink container 20. The reference symbol A3 in FIG. 8 indicates imaginary lines showing the roller positions in FIG. 7.

Actions in taking out the drink container 20 in the state illustrated in FIG. 8 are as follows. In one example, the drink container 20 in the state in FIG. 8 is pulled up in an arrow X2 direction. Then, the roller 12 rotates around the center axis Ax2 of the second support shaft 12a in an arrow R2 direction in FIG. 8 and moves along the constricted part on the outer surface of the drink container 20 while abutting on the outer surface of the drink container 20. Along with this movement, the roller 12 moves in the arrow Y1 direction in FIG. 8. Then, the container holder 1 and the drink container 20 come to the positions illustrated in FIG. 7.

When the drink container 20 in the state in FIG. 7 is further pulled up in the arrow X2 direction, the roller 12 moves along the outer surface of the drink container 20 and also moves in the arrow Y1 direction while rotating in the arrow R2 direction. Then, the container holder 1 and the drink container 20 soon come to the positions illustrated in FIG. 6.

When the drink container 20 in the state in FIG. 6 is further pulled up in the arrow X2 direction, the roller 12 moves along the outer surface of the drink container 20 and also moves in the arrow Y2 direction while continuously rotating in the arrow R2 direction. Then, the container holder 1 and the drink container 20 soon return to the initial states illustrated in FIG. 3.

In this manner, in putting in or taking out the drink container 20, the roller 12 moves in the arrow Y1 and Y2 directions in accordance with the protrusion-and-recess shape on the outer surface while continuously rotating in contact with the outer surface of the drink container 20. After the drink container 20 is completely contained, each roller 12 is biased to the outer surface of the drink container 20 by the biasing force of the corresponding roller-biasing spring 15.

In taking out the drink container 20, the roller 12 moves along the outer surface of the drink container 20 while rotating, and the roller 12 also moves in the arrow Y1 and Y2 directions along the outer surface of the drink container 20. The constituent member of the container-holding mechanism 3 that abuts on the outer surface of the drink container 20 is able to continuously move in this manner, and therefore, the constituent member of the container-holding mechanism 3 is not caught by the outer surface of the drink container 20.

Next, actions in putting and taking a second type drink container 20A, which is different from the first type drink container 20, in and out of the container holder 1 of this embodiment will be described hereinafter.

Figure 9:
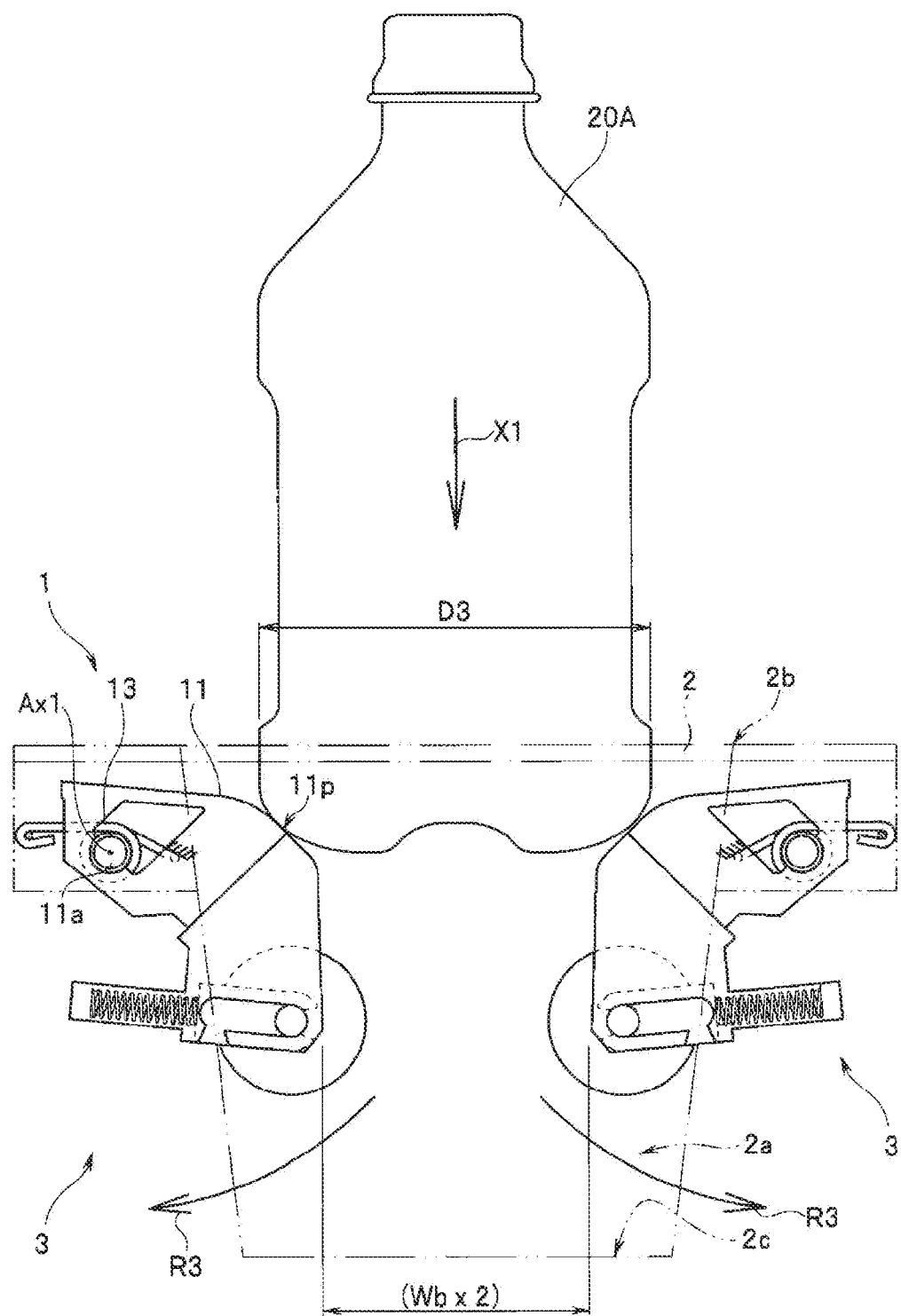
FIG. 9 illustrates the initial state of the container holder of the embodiment of the disclosure, in relation to actions in putting and taking a second type drink container in and out thereof.
Figure 10:
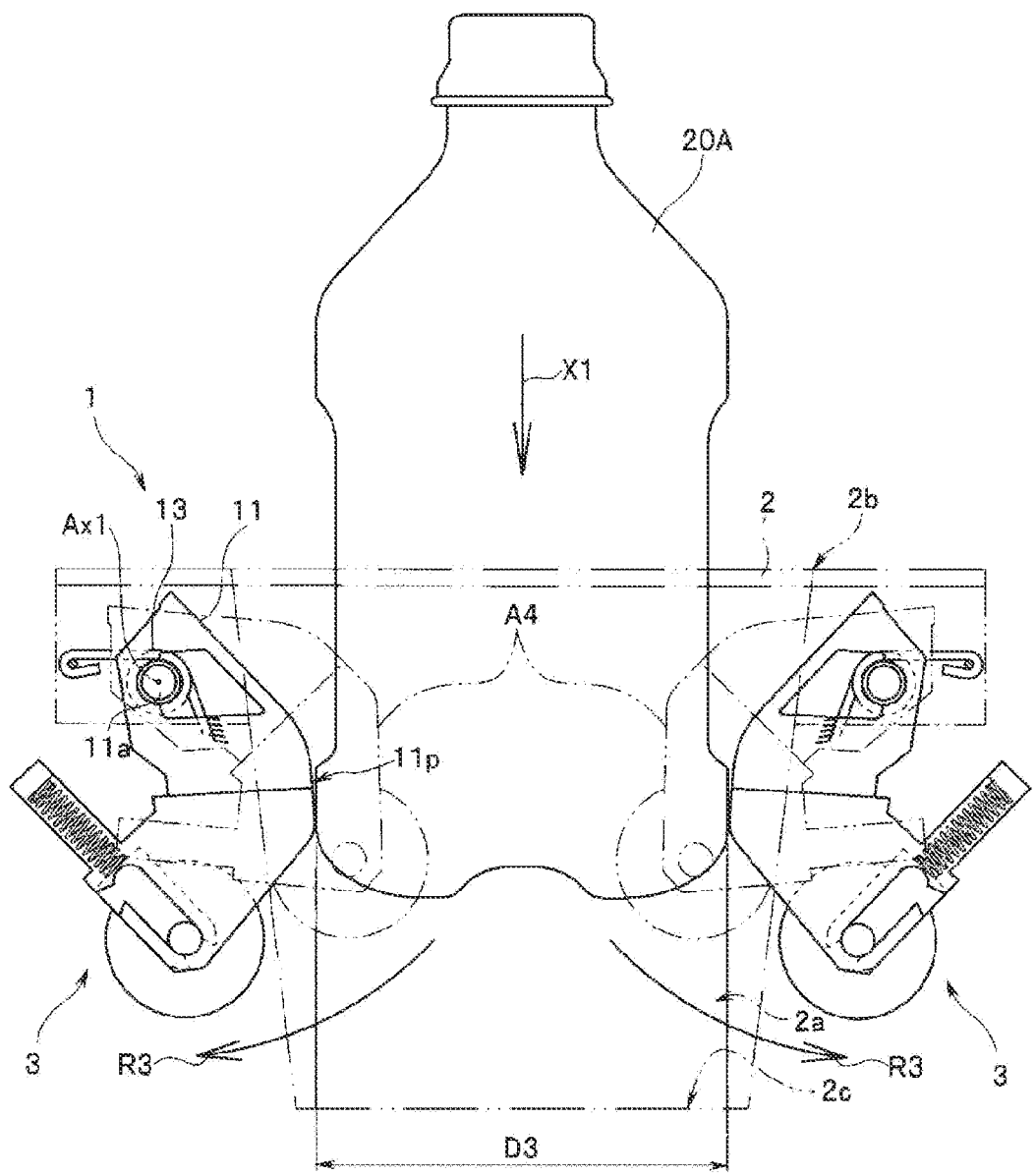
FIG. 10 illustrates a state during putting the drink container in the container holder, following the state in FIG. 9.
Figure 11:
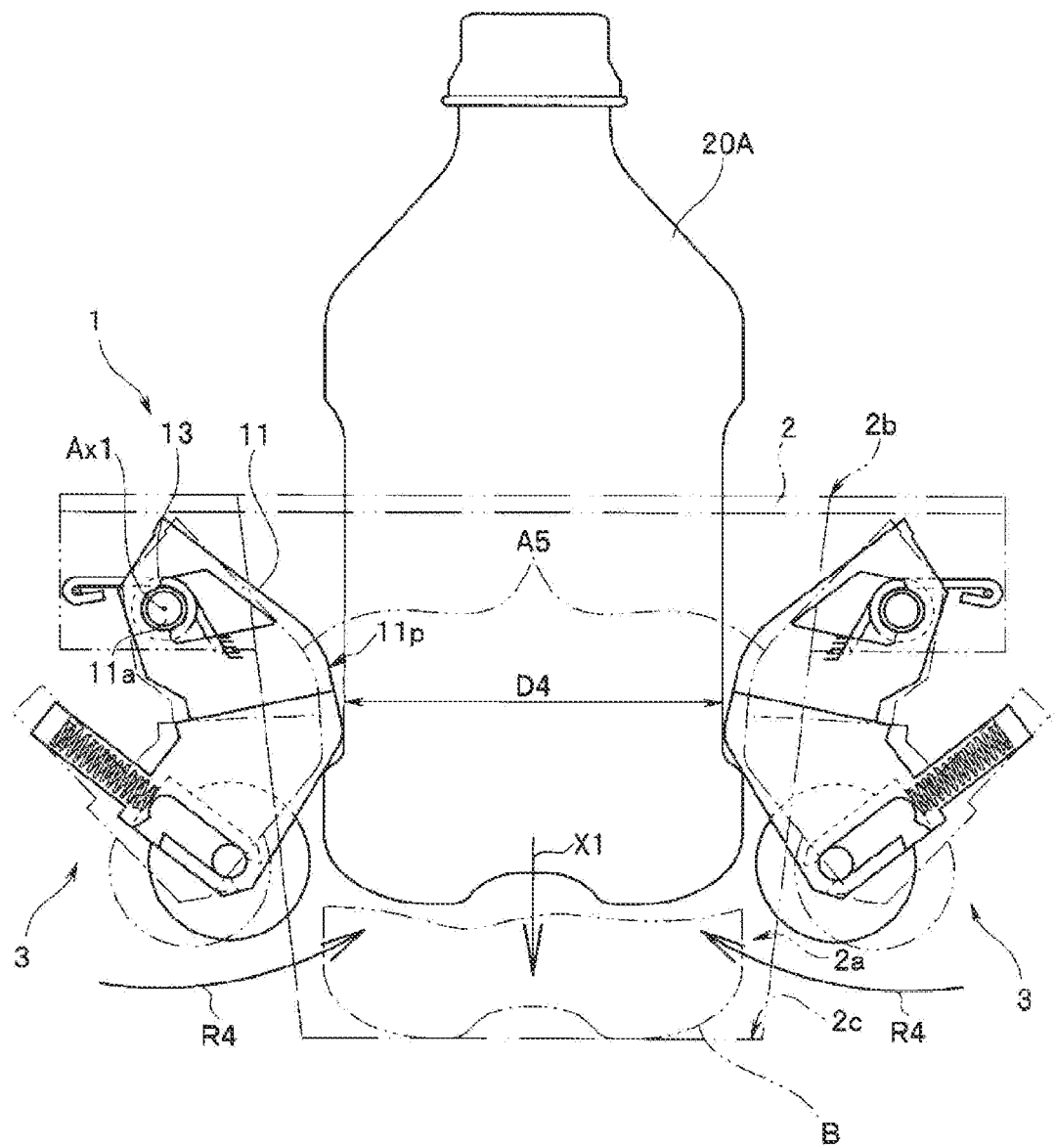
FIG. 11 illustrates a state following the state in FIG. 10.

FIGS. 9 to 11 illustrate actions in putting and taking the second type drink container 20A in and out of the container holder 1 of this embodiment.

FIG. 9 illustrates the initial state of the container holder 1 of this embodiment (corresponds to FIG. 3). The following focuses on actions in putting the drink container 20A in the container receiver 2a of the container holder 1 in this state.

The second type drink container 20A has a size greater than that of the first type drink container 20 (e.g., volume of around 1 liter) and is an embodiment of a bottle-shaped drink container with a protrusion and a recess on an outer surface. The maximum diameter of the drink container 20A is denoted by a reference symbol D3, as illustrated in FIG. 9. Herein, the maximum diameter D3 of the drink container 20A is assumed to be, for example, approximately equal to the diameter of a bottom surface of the drink container 20A, as illustrated in FIG. 9.

The distance between the bodies 11 of the container-holding mechanisms 3 in the initial state in the container holder 1 is denoted by "Wb×2", as illustrated in FIG. 9.

Herein, it is assumed that the maximum diameter D3 of the drink container 20A is larger than the distance between the bodies 11 of the container-holding mechanisms 3 (Wb×2). That is, it is assumed that the following relationship holds:

$$D3 > (Wb \times 2)$$

First, as illustrated in FIG. 9, the drink container 20A is put from the opening 2b of the holder body 2 into the container holder 1 that is in the initial state, in the direction along the arrow X1. At this time, due to the dimensions of the drink container 20A and the container holder 1 having a relationship of the above-described formula, an outer surface close to the bottom surface of the drink container 20A abuts on the sloped surfaces 11p among outer circumferential surfaces of the bodies 11.

When the drink container 20A is continuously inserted in the same arrow X1 direction, each of the bodies 11 is pressed by the outer surface of the drink container 20A and swings around the center axis Ax1 of the first support shaft 11a in an arrow R3 direction in FIG. 9, against the biasing force of the helical torsion spring 13. At this time, the roller 12 swings together with the body 11, but it does not come into contact with the drink container 20A.

As the drink container 20A is further inserted in the arrow X1 direction, the bodies 11 continuously swing in the arrow R3 direction. Then, the container holder 1 and the drink container 20A come to the positions illustrated in FIG. 10.

FIG. 10 illustrates a state following the state in FIG. 9. FIG. 10 illustrates the body 11 abutting on a maximum diameter part of the drink container 20A. The reference symbol A4 in FIG. 10 indicates imaginary lines showing the initial positions (positions in FIG. 9) of the bodies 11 and the rollers 12.

When the drink container 20A in the state in FIG. 10 is further inserted in the arrow X1 direction, the bodies 11 move along the outer surface of the drink container 20A. At this time, each body 11 is pressed to the outer surface of the drink container 20A by the biasing force of the helical torsion spring 13. Thus, the bodies 11 move along the outer surface of the drink container 20A while continuously abutting thereon. Then, the container holder 1 and the drink container 20A come to the positions illustrated in FIG. 11.

FIG. 11 illustrates a state in which the drink container is completely contained, following the state in FIG. 10. FIG. 11 illustrates the body 11 abutting on a constricted part on the outer surface of the drink container 20A. The reference symbol D4 in FIG. 11 indicates a diameter of a narrow part of the constricted part on the outer surface of the drink container 20A. The reference symbol A5 in FIG. 11 indicates body positions in FIG. 10.

When the drink container 20A in the state in FIG. 11 is further inserted in the arrow X1 direction, the bodies 11 move along the outer surface of the drink container 20A. In more detail, the body 11 moves from the maximum diameter part to the constricted part, along the outer surface of the drink container Thus, the body 11 swings in an arrow R4 direction at this time. When the bottom surface of the drink container 20A comes to the position indicated by a two-dot chain line with a reference symbol B in FIG. 11, the drink container 20A is completely contained in the container holder 1.

Actions in taking out the drink container 20A in the state in FIG. 11 are performed in approximately the same manner, except that they are performed in the order reverse to that of actions in putting in it. In view of this, descriptions of actions in taking out the drink container 20A are omitted.

In this manner, for the drink container 20A having a protrusion and a recess on the outer surface and being large in size, the sloped surface 11p of the outer surface of the body 11 abuts on the outer surface of the drink container 20A, and the body 11 swings in accordance with the protrusion-and-recess shape of the outer surface on the drink container 20A. After the drink container 20A is completely contained, each body 11 is biased to the outer surface of the drink container 20A by the biasing force of the corresponding helical torsion spring 13.

The outer surface of the drink container 20A continuously abuts on the outer surface, including the sloped surface 11p, of the body 11, and thus, the outer surface of the drink container 20A is not caught by the body 11. Even if caught by the body 11, the outer surface of the drink container 20A is appropriately released due to the body 11 swinging in accordance with an ordinary putting-in operation or an ordinary taking-out operation, without causing a user to pay attention.

The maximum diameter of a drink container that can be used in the container holder 1 of this embodiment is specified by, for example, the distance between the bodies 11 at the time the body 11 turns in the arrow R3 direction in FIG. 10 and other drawings, in each container-holding mechanism 3. In some embodiments, the minimum diameter of a drink container that can be used is, for example, the distance between the rollers 12 of the container-holding mechanisms 3 in the initial state (Wr×2).

In the first embodiment, in putting in or taking out the drink container 20, the roller 12 moves in the arrow Y1 and Y2 directions in accordance with the protrusion-and-recess shape on the outer surface while continuously rotating in contact with the outer surface of the drink container 20, as described above. After the drink container 20 is completely contained, each roller 12 is biased to the outer surface of the drink container 20 by the biasing force of the corresponding roller-biasing spring 15.

Thus, although having a protrusion and a recess on the outer surface, the drink container 20 is not caught at the outer surface by the constituent members of the container-holding mechanism 3 and is thereby smoothly put in and taken out.

In addition, even if the constituent member of the container-holding mechanism 3 catches the outer surface of the drink container 20, the roller 12 rotates and moves along the outer surface of the drink container 20, and the roller 12 also moves in the arrow Y1 and Y2 directions. With this structure, the caught outer surface of the drink container 20 is appropriately released in accordance with an ordinary putting-in operation or an ordinary taking-out operation, without causing a user to pay attention.

Thus, a user hardly feels unnecessary stress in putting in and taking out the drink container.

Moreover, for the drink container 20A having a protrusion and a recess on the outer surface and being large in size, the outer surface (sloped surface 11p) of the body 11 continuously abuts on the outer surface of the drink container 20A, and the body 11 swings in accordance with the protrusion-and-recess shape on the outer surface of the drink container 20A. After the drink container 20A is completely contained, each body 11 is biased to the outer surface of the drink container 20A by the biasing force of the corresponding helical torsion spring 13.

Thus, although the second type drink container 20A has a shape as described above, the drink container 20A is not caught at the outer surface by the constituent members of the container-holding mechanism 3 and is thereby smoothly put in and taken out. In addition, even if the constituent member of the container-holding mechanism 3 catches the outer surface of the drink container 20A, the caught outer surface of the drink container 20A is appropriately released due to the body 11 itself swinging in accordance with an ordinary putting-in operation or an ordinary taking-out operation, without causing a user to pay attention. Thus, a user hardly feels unnecessary stress in putting in and taking out the drink container.

Second Embodiment

Next, a container holder of a second embodiment of the disclosure will be described hereinafter. FIGS. 12 to 21 illustrate the second embodiment of the disclosure. Among them, FIGS. 12 to 15 illustrate a configuration of the second embodiment of the disclosure. FIGS. 16 to 21 illustrate actions of the second embodiment of the disclosure.

The configuration of a container holder 1A of this embodiment is basically approximately the same as that of the container holder of the first embodiment. For this reason, in the following descriptions, the same constituent members as those of the first embodiment are denoted by the same reference symbols and are not repeatedly explained, and different parts are mainly described.

Figure 12:
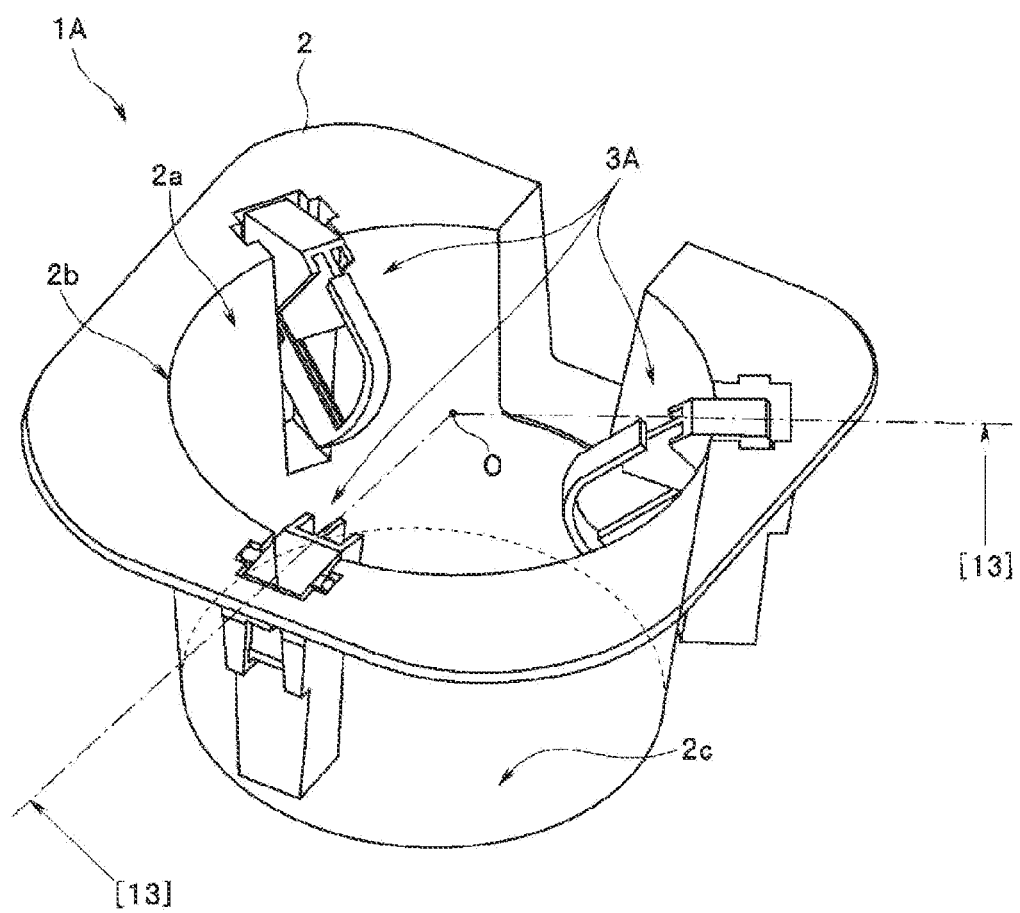
FIG. 12 is an external perspective view illustrating a schematic configuration of a container holder of an embodiment of the disclosure.
Figure 13:
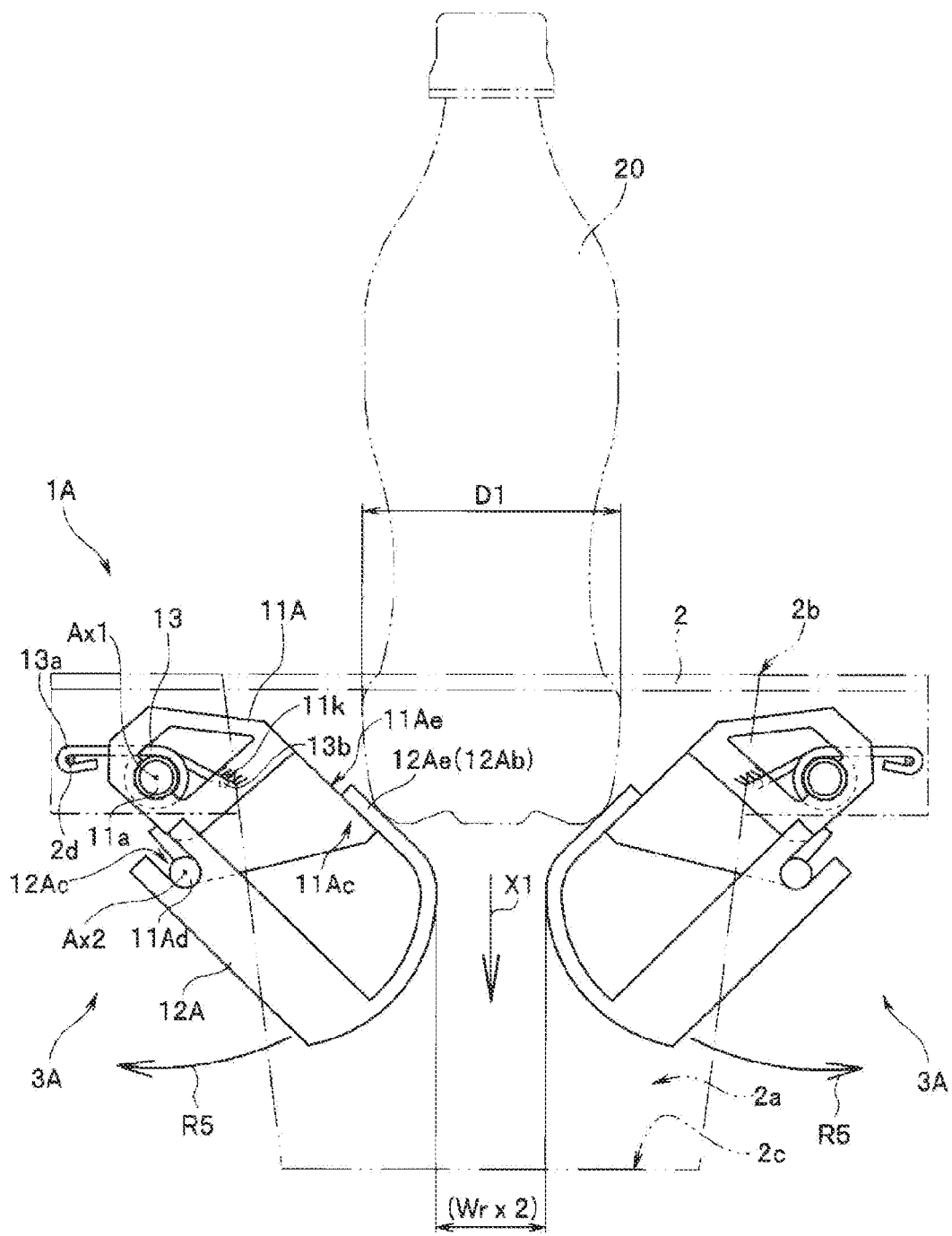
FIG. 13 is a schematic sectional view along a line [13]-[13] in FIG. 12.
Figure 14:
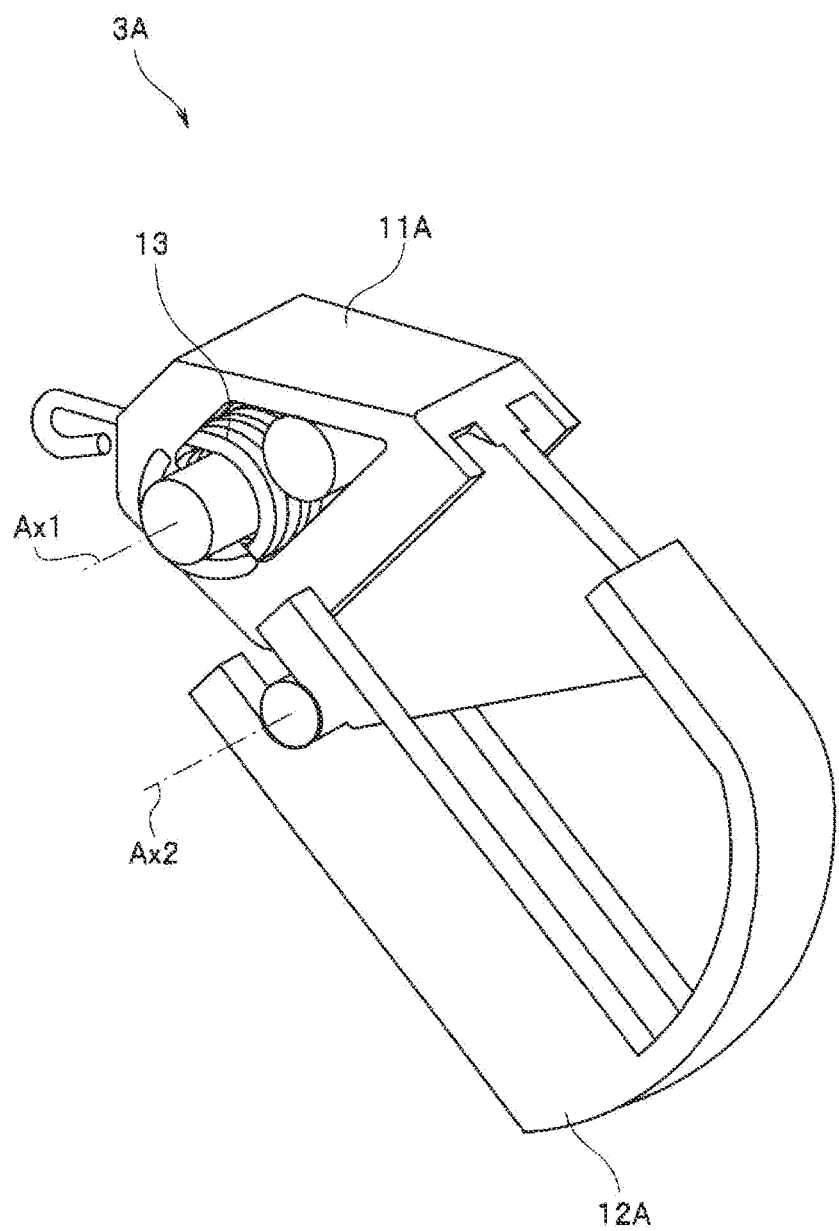
FIG. 14 is an external perspective view illustrating one of container-holding mechanisms that is extracted from the container holder illustrated in FIG. 12.
Figure 15:
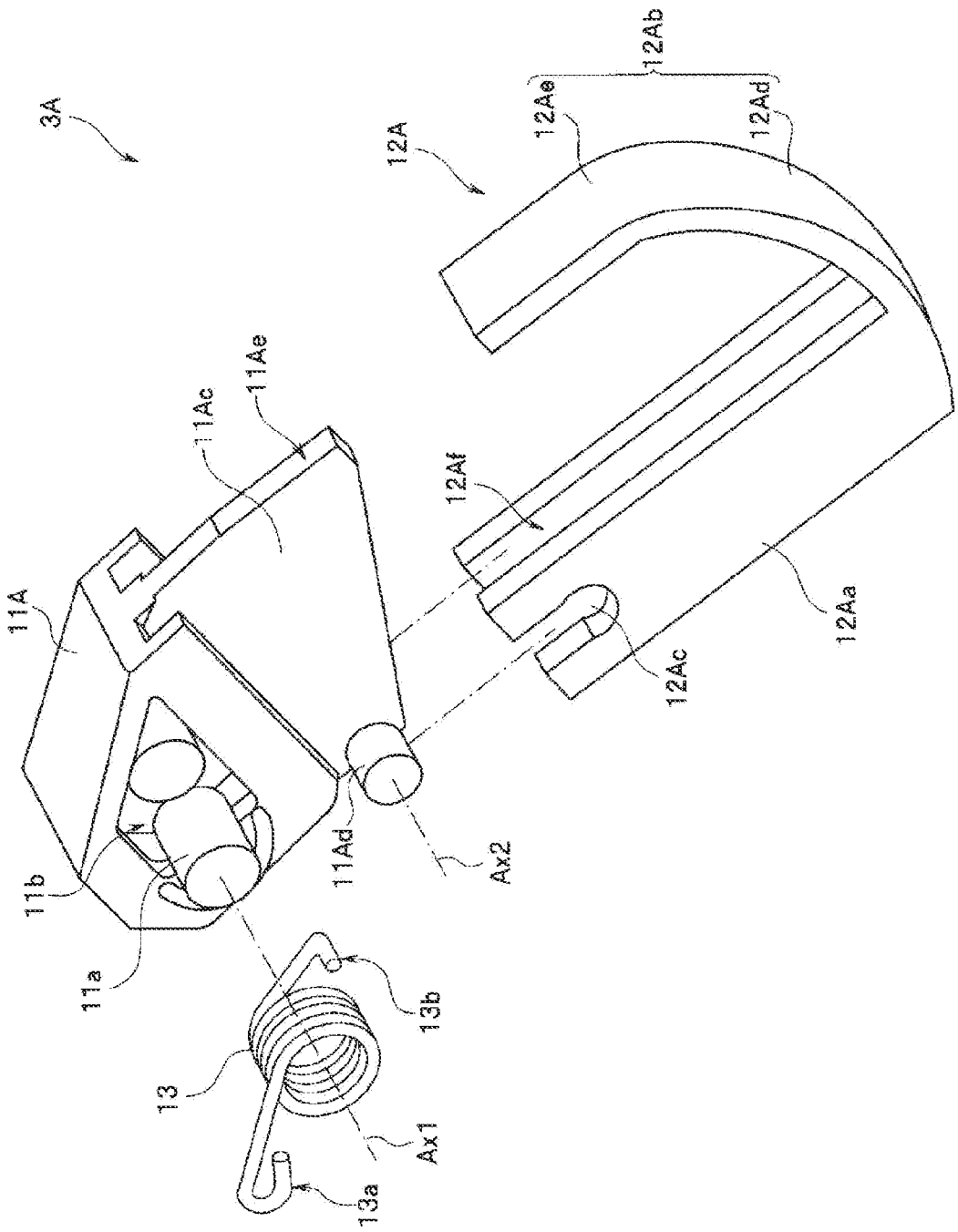
FIG. 15 is an exploded perspective view of the container-holding mechanism illustrated in FIG. 14.

First, the configuration of the container holder 1A of the second embodiment of the disclosure will be described by using FIGS. 12 to 15, hereinafter. FIG. 12 is an external perspective view illustrating a schematic configuration of the container holder 1A of the second embodiment of the disclosure. FIG. 13 is a schematic sectional view along a line-in FIG. 12. FIG. 14 is an external perspective view illustrating one of container-holding mechanisms that is extracted from the container holder 1A illustrated in FIG. 12. FIG. 15 is an exploded perspective view of the container-holding mechanism illustrated in FIG. 14. FIGS. 12 to 14 illustrate the container-holding mechanism in an unloaded state.

As illustrated in FIG. 12 and other drawings, the container holder 1A of this embodiment is composed mainly of a holder body 2 and multiple container-holding mechanisms 3A.

Among them, the holder body 2 has a structure approximately the same as that of the holder body 2 of the first embodiment. In view of this, descriptions of the structure of the holder body 2 are omitted.

The container-holding mechanism 3A is a mechanism unit for stably holding a drink container that is contained in a container receiver 2a. As in the case of the first embodiment, multiple container-holding mechanisms 3A are arranged so as to surround the container receiver 2a. The container holder 1A of this embodiment is illustrated by an exemplary structure as follows: three container-holding mechanisms 3A are arranged at respective positions at approximately equal intervals (e.g., 120-degree intervals) around a center axis O of an opening 2b of the container receiver 2a, in the same manner as in the first embodiment. As in the case of the first embodiment, the number of the arranged container-holding mechanisms 3A is not limited to that illustrated in this embodiment. Moreover, it is desirable to arrange at least three container-holding mechanisms 3A to one container holder 1A in this embodiment, and this is the same as in the first embodiment.

Next, details of the structure of the container-holding mechanism 3A in the container holder 1A of this embodiment will be described hereinafter. As illustrated in FIGS. 14 and 15 and other drawings, the container-holding mechanism 3A is composed mainly of a body 11A, an arm member 12A, and a helical torsion spring 13.

The body 11A is a swing member that is swingably disposed to the holder body 2. The body 11A is a block member that is formed into a flat plate shape.

The body 11A is formed with a first support shaft 11a (refer to FIG. 15) in an area close to one end. As in the case of the first embodiment, the first support shaft 11a is a shaft part that axially supports the body 11A such that the body 11A is swingable relative to the holder body 2. The first support shaft 11a has a center axis Ax1 that is approximately parallel to a tangential line of a circle around a center axis O of the opening 2b (refer to FIG. 2).

The helical torsion spring 13 is wound around to be disposed to the first support shaft 11a. The structure of the helical torsion spring 13 itself is the same as that in the first embodiment. In addition, arrangements and actions of the body 11A and the helical torsion spring 13 are also the same as those in the first embodiment.

That is, as illustrated in FIG. 13 and other drawings, the helical torsion spring 13 is disposed to a spring placement part 11b (refer to FIG. 15) of the body 11 and has one arm 13a that is hooked to a predetermined fixing part 2d of the holder body 2. The other arm 13b of the helical torsion spring 13 is engaged with a predetermined fixing part 11k of the body 11A. With this structure, swing around the center axis Ax1 of the first support shaft 11a of the body 11A is limited in a predetermined range by the helical torsion spring 13. In addition, the body 11A is biased in a predetermined direction around the center axis Ax1 of the first support shaft 11a (a radially inward direction of the opening 2b of the container receiver 2a) by a biasing force of the helical torsion spring 13.

FIGS. 12 to 14 illustrate the helical torsion spring 13 in the initial state with no load applied. Under these conditions, the body 11A remains in the state illustrated in FIG. 13.

The body 11A is formed with a second support shaft 11Ad and a guide wall 11Ac in an area close to the other end (refer to FIG. 15).

The second support shaft 11Ad is a shaft part that axially supports the arm member 12A (detailed later) such that the arm member 12A is turnable relative to the body 11A. The second support shaft 11Ad has a center axis Ax2 that is approximately parallel to the first support shaft 11a (refer to FIG. 15).

The guide wall 11Ac is a constituent part that guides a turning direction of the arm member 12A and limits a turning range of the arm member 12A at the time the arm member 12A turns relative to the body 11A.

The arm member 12A is a turning member that is disposed such that the turning member is turnable relative to the body 11A due to the second support shaft 11Ad. The arm member 12A includes a base 12Aa and an arm 12Ab.

The base 12Aa has a through hole 12Ac in an area close to one end. The second support shaft 11Ad of the body 11A engages with the through hole 12Ac so that the arm member 12A will be turnable. For this purpose, the through hole 12Ac is partially opened to the one end of the base 12Aa. This structure allows the arm member 12A that is assembled to the body 11A, to turn around the second support shaft 11Ad. In this case, the turning range of the arm member 12A is limited to a predetermined range by a mechanism described later.

The arm 12Ab is extended at the other end of the base 12Aa. The arm 12Ab has a circular arc-shaped part 12Ad and a turning-limiting part 12Ae.

One end of the circular arc-shaped part 12Ad is continuously provided to the other end of the base 12Aa. The circular arc-shaped part 12Ad is a plate-shaped member, which has elasticity and is formed into a circular arc shape, as a whole. The turning-limiting part 12Ae is continuously provided to the other end of the circular arc-shaped part 12Ad. The turning-limiting part 12Ae abuts on a limiting flat surface 11Ae, which is a part of an outer surface of the guide wall 11Ac, to limit the turning range of the arm member 12A at the time the arm member 12A turns relative to the body 11A. The outer surface of the arm 12Ab includes a smooth surface.

The base 12Aa also has a guide groove 12Af. The guide groove 12Af allows the guide wall 11Ac to pass therethrough to guide turning of the arm member 12A at the time the arm member 12A turns relative to the body 11A.

The container-holding mechanism 3A having such a structure is assembled as follows. First, the second support shaft 11Ad of the body 11A is inserted into the through hole 12Ac of the arm member 12A. This makes the arm member 12A be turnable relative to the body 11.

At this time, the arm member 12A is disposed so that the guide wall 11Ac can freely pass the guide groove 12Af at the time the arm member 12A turns. In addition, the arm member 12A is disposed so that the turning-limiting part 12Ae will abut on the limiting flat surface 11Ae of the guide wall 11Ac at the time the arm member 12A turns.

The component unit having the arm member 12A that is thus attached to the body 11A is assembled to the holder body 2. The assembling is performed in the same manner as in the first embodiment. That is, the helical torsion spring 13 is wound around the first support shaft 11a and is disposed inside a spring placement part 11b. Then, the one arm 13a of the helical torsion spring 13 is hooked to the fixing part 2d of the holder body 2. The other arm 13b of the helical torsion spring 13 is engaged with the fixing part 11k of the body 11. In this manner, mounting the container-holding mechanism 3A to a predetermined position of the holder body 2 is completed.

Next, actions of the container holder 1A of this embodiment will be described by using FIGS. 13 and 16 to 21, hereinafter. The actions described below are performed in putting and taking each type of drink container in and out of the container holder LA of this embodiment.

First, actions in putting and taking a first type drink container 20 in and out of the container holder LA of this embodiment will be described by using FIGS. 13, 16, and 17.

Herein, the first type drink container 20 is approximately the same as the first type drink container 20 described in relation to the first embodiment (e.g., the maximum diameter D1).

FIG. 13 illustrates the initial state of the container holder 1A of this embodiment. The following focuses on actions in putting the drink container 20 indicated by two-dot chain lines in the container receiver 2a of the container holder 1A in this state.

The distance between the arm members 12A of the container-holding mechanisms 3A in the initial state in the container holder 1A is denoted by "Wr×2", as illustrated in FIG. 13.

Herein, it is assumed that the maximum diameter D1 of the drink container 20 is larger than the distance between the arm members 12A of the container-holding mechanisms 3A (Wr×2). That is, it is assumed that the following relationship holds:

$$D1 > (Wr \times 2)$$

In the initial state of the container holder 1A of this embodiment, the arm member 12A of each container-holding mechanism 3A is subjected to a gravity force and is thus applied with a force for turning in an upward direction in FIG. 13, around the center axis Ax2 of the second support shaft 11Ad. In the initial state illustrated in FIG. 13, the arm member 12A abuts on the limiting flat surface 11Ae of the body 11A at the turning-limiting part 12Ae and is thereby limited in turning in this direction. As a result, each container-holding mechanism 3A remains in the state illustrated in FIG. 13.

First, as illustrated in FIG. 13, the drink container 20 is put from the opening 2b of the holder body 2 into the container holder 1A that is in the initial state, in the direction along an arrow X1. At this time, due to the dimensions of the drink container 20 and the container holder LA having a relationship of the above-described formula, an outer surface close to the bottom surface of the drink container 20 abuts on outer circumferential surfaces of the arms 12Ab of the arm members 12A.

When the drink container 20 is continuously inserted in the same arrow X1 direction, the arms 12Ab of the arm members 12A are pressed to the outer surface of the drink container 20. The pressing force of the drink container 20 acts as a force for turning the arm member 12A in an arrow R5 direction in FIG. 13. However, the arm member 12A abuts on the limiting flat surface 11Ae at the turning-limiting part 12Ae, at this time. Thus, the pressing force of the drink container 20 is transmitted to the body 11A (guide wall 11Ac) via the arm member 12A (turning-limiting part 12Ae). In response to this, the body 11A swings around the center axis Ax1 of the first support shaft 11a, in the arrow R5 direction in FIG. 13. Simultaneously, the arm member 12A also swings in accordance with swing of the body 11A, in an integral manner. As the drink container 20 is further inserted in the arrow X1 direction, the container holder 1A and the drink container 20 come to the positions illustrated in FIG. 16.

Figure 16:
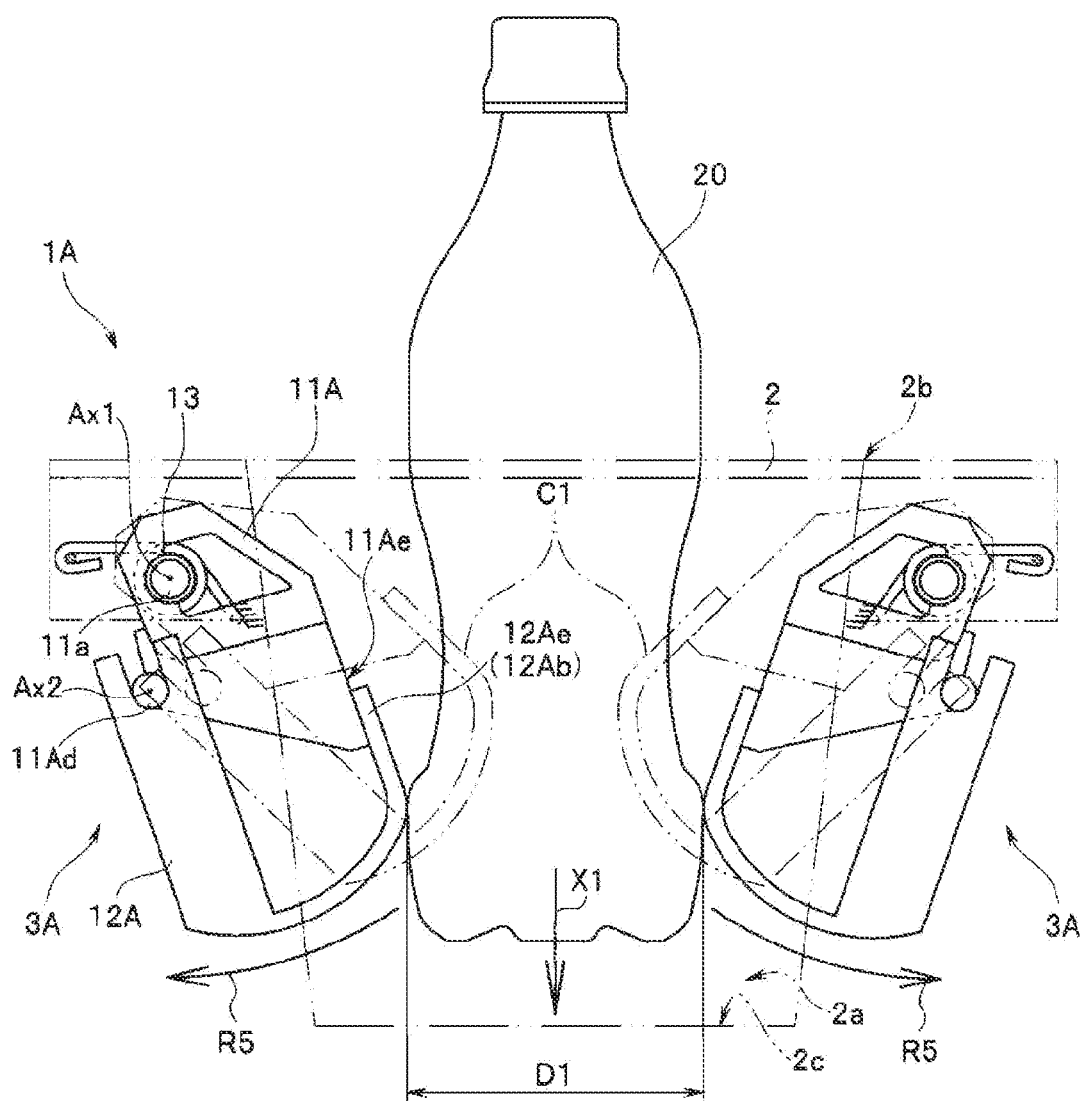
FIG. 16 illustrates a state during putting the first type drink container in the container holder of the embodiment of the disclosure.

FIG. 16 illustrates a state following the state in FIG. 13. FIG. 16 illustrates the arm 12Ab of the arm member 12A abutting on a maximum diameter part of the drink container 20. The reference symbol C1 in FIG. 16 indicates imaginary lines showing the initial positions of the arm members 12A (arm member positions in FIG. 13).

When the drink container 20 in the state in FIG. 16 is further inserted in the arrow X1 direction, the arms 12Ab of the arm members 12A move along the outer surface of the drink container 20. Then, the container holder LA and the drink container 20 come to the positions illustrated in FIG. 17.

Figure 17:
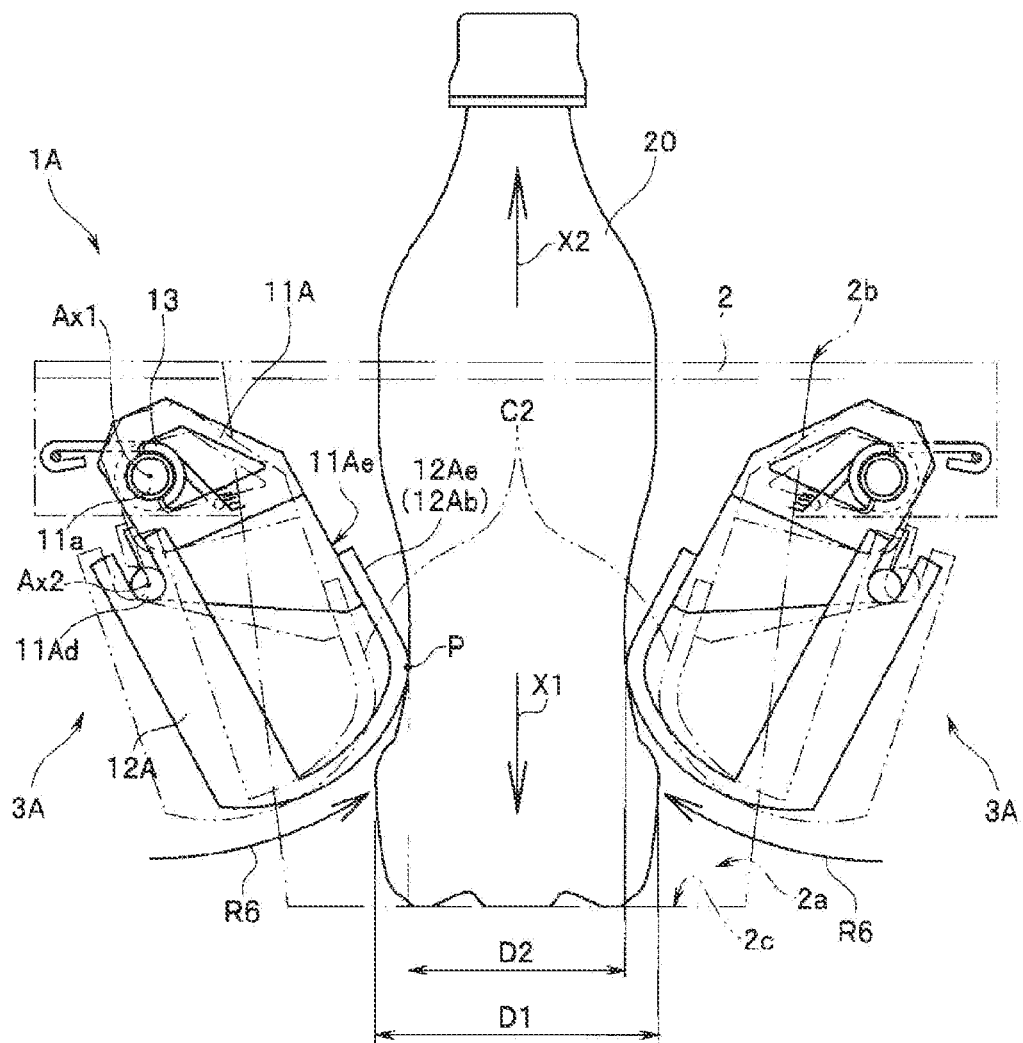
FIG. 17 illustrates a state following the state in FIG. 16.

FIG. 17 illustrates a state in which the drink container is completely contained in the container holder 1A, following the state in FIG. 16. FIG. 17 illustrates the arm 12Ab of the arm member 12A abutting on a constricted part on the outer surface of the drink container 20 to stably hold the drink container 20. Herein, the reference symbol P in FIG. 17 represents an abutting point between an outer surface of the arm 12Ab and an outer surface at the constricted part of the drink container 20. The reference symbol D2 in FIG. 17 indicates a diameter of a narrow part of the constricted part of the drink container 20. In addition, the reference symbol C2 in FIG. 17 indicates imaginary lines showing the arm member positions in FIG. 16.

When the state in FIG. 16 is changed to the state in FIG. 17, each pair of the body 11A and the arm member 12A is pressed to the outer surface of the drink container 20 by the biasing force of the helical torsion spring 13. Thus, the arms 12Ab of the arm members 12A move along the constricted part while continuously abutting on the outer surface of the drink container 20. At this time, each pair of the body 11A and the arm member 12A swings in an arrow R6 direction in FIG. 17. Thereafter, the drink container 20 is stably held in the state in FIG. 17.

Actions in taking out the drink container 20 in the state illustrated in FIG. 17 are as follows.

FIGS. 18 to 21 illustrate actions in taking the first type drink container 20 out of the container holder 1A of this embodiment.

Figure 18:
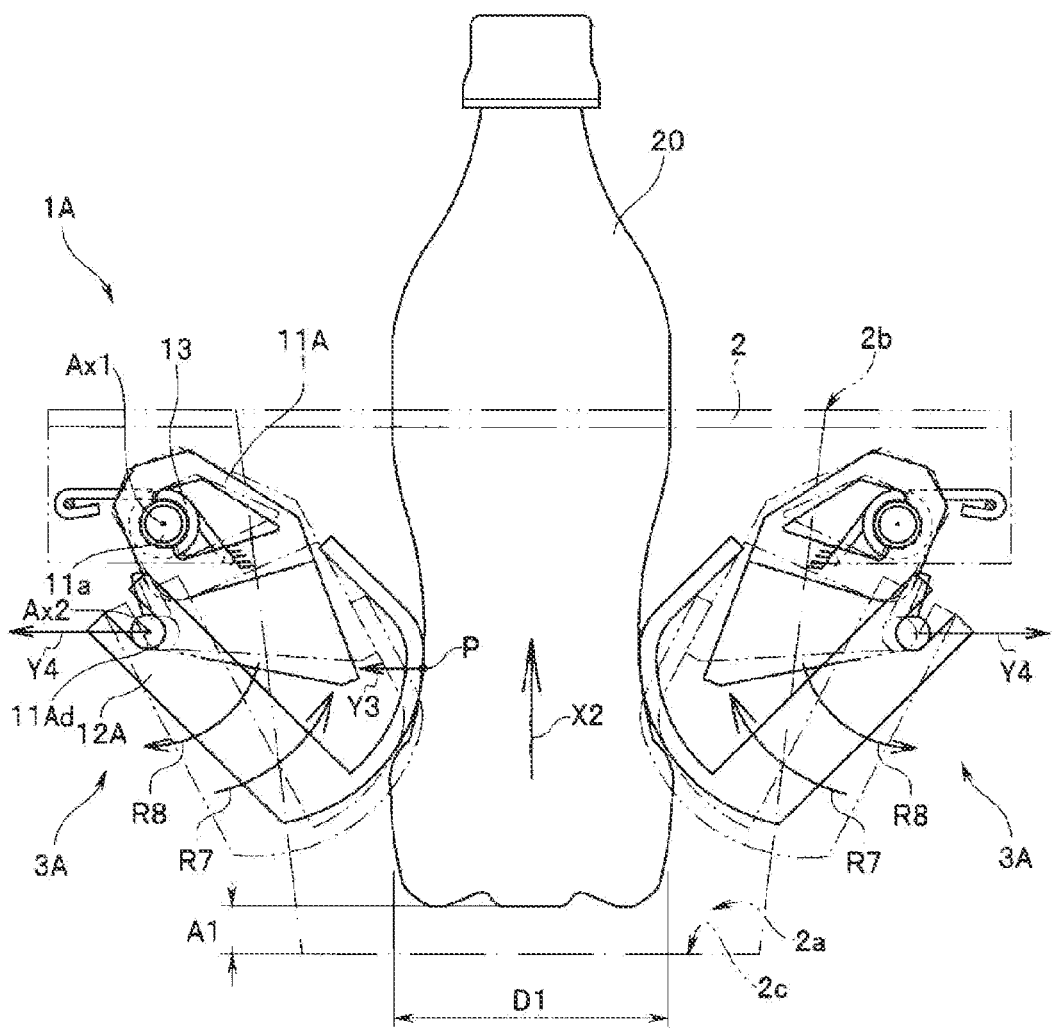
FIG. 18 illustrates a state in which the container holder of the embodiment of the disclosure contains the first type drink container, in relation to actions in taking the first type drink container out thereof.

FIG. 18 illustrates a state in which the drink container is pulled out by a predetermined amount after the drink container 20 is contained in the container holder 1A of this embodiment and is stably held (the state in FIG. 17). The following describes actions in taking the drink container 20 in the state illustrated in FIG. 17, out of the container receiver 2a of the container holder 1A.

It is assumed that the drink container 20 in the state illustrated in FIG. 17 is pulled up in an arrow X2 direction in order to take out the drink container 20. In the state illustrated in FIG. 17, the biasing force that is accumulated in the helical torsion spring 13 acts on the body 11A, as described above. In response to this, the body 11A is biased in the upward direction in FIG. 17, around the center axis Ax1 of the first support shaft 11a.

In addition, at this time, the limiting flat surface 11Ae of the body 11A and the turning-limiting part 12Ae of the arm member 12A abut with each other. This makes the biasing force of the helical torsion spring 13 be transmitted to the turning-limiting part 12Ae via the limiting flat surface 11Ae. Thus, at this time, the arm member 12A is biased in the upward direction in FIG. 17, around the center axis Ax2 of the second support shaft 11Ad.

In short, at this time, the body 11A and the arm member 12A are biased together in the upward direction in FIG. 17. As a result, in the state illustrated in FIG. 17, the outer surface of the arm 12Ab of the arm member 12A is continuously pressed to abut on a predetermined position (abutting point P in FIG. 17) on the outer surface of the drink container 20.

The drink container 20 in such a state is pulled up in the arrow X2 direction in FIG. 17. Then, in the container holder 1A of this embodiment, first, the arm member 12A starts to turn around the center axis Ax2 of the second support shaft 11Ad, in an arrow R7 direction in FIG. 18 (in an upward direction in FIG. 18).

In the state illustrated in FIG. 17, the arm member 12A abuts on the constricted part of the drink container 20. The outer surface of the drink container 20 is formed in such a manner as to gradually increase in width from the constricted part with a small diameter (diameter D2) to the maximum diameter D1 part, in the direction of pulling up the drink container 20. For this reason, at the time of being moved in the direction of pulling up, the drink container 20 is pulled up while the arm member 12A remains at the constricted part of the drink container 20. This causes the arm member 12A to start to turn around the center axis Ax2 of the second support shaft 11Ad, in the arrow R7 direction in FIG. 18. Meanwhile, abutting between the outer surface of the arm member 12A and the outer surface of the drink container 20 is maintained.

At the time the arm member 12A thus starts to turn around the center axis Ax2 in the arrow R7 direction, abutting between the outer surface of the arm member 12A and the outer surface of the drink container 20 is maintained, as described above. Under these conditions, when the drink container 20 is pulled up, the abutting point P moves along the outer surface of the drink container 20. The outer surface of the drink container is formed in such a manner as to increase in diameter to the outside. In view of this, for the abutting point P, it moves in an arrow Y3 direction in FIG. 18.

In other words, the outer surface of the drink container outwardly pushes the outer surface of the arm member 12A in the arrow Y3 direction in FIG. 18, at the abutting point P. The pushing force in the arrow Y3 direction of the outer surface of the drink container 20 acts as a force for moving the second support shaft 11Ad in an arrow Y4 direction in FIG. 18, via the arm member 12A. This makes the body 11A turn around the center axis Ax1 of the first support shaft 11a in an arrow R8 direction in FIG. 18 (in the upward direction in FIG. 18), against the biasing force of the helical torsion spring 13. Then, the state is soon changed to the state illustrated in FIG. 19.

Figure 19:
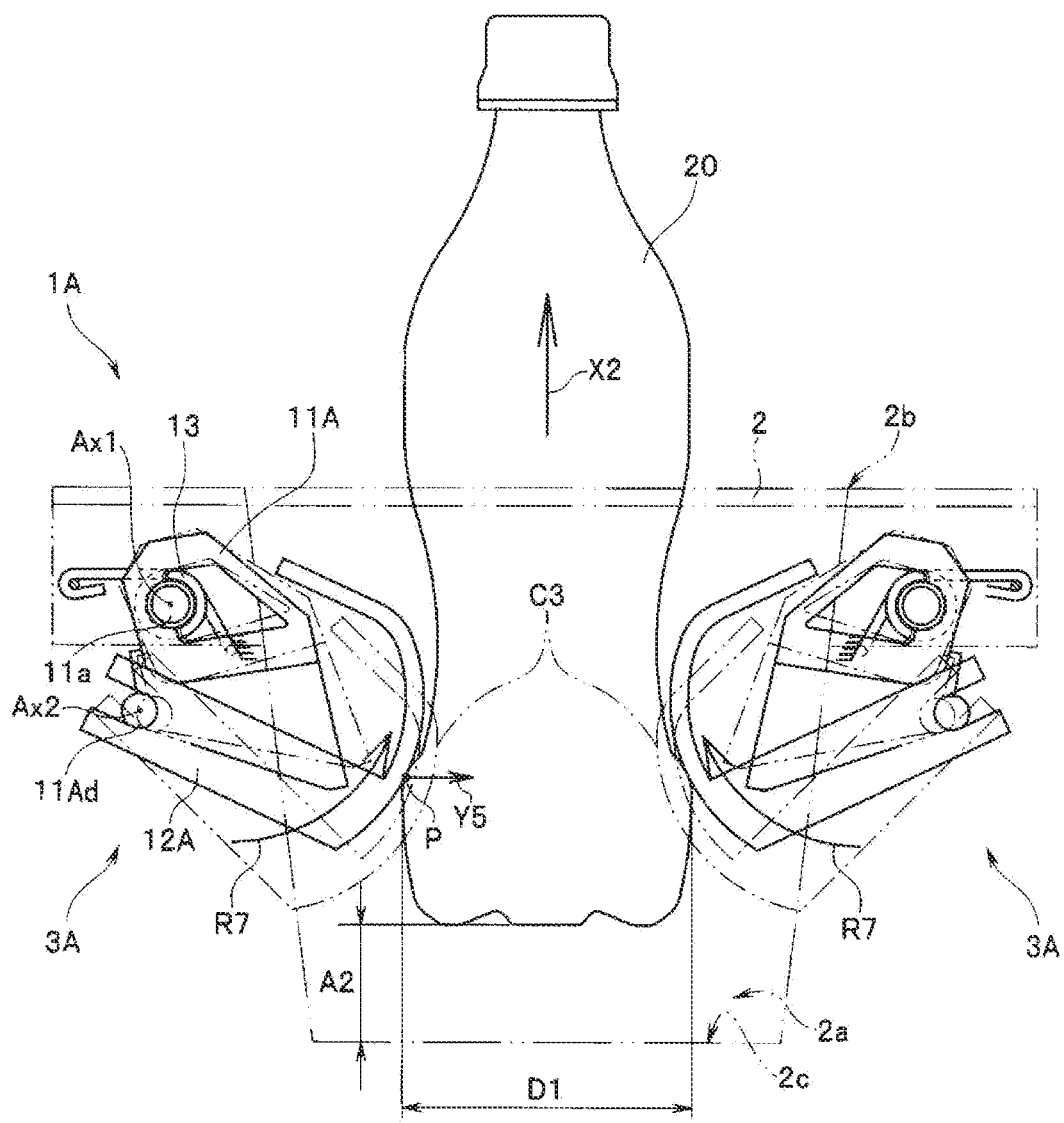
FIG. 19 illustrates a state following the state in FIG. 18.

FIG. 19 illustrates a state following the state in FIG. 18. FIG. 19 illustrates a state in which, as the drink container is further pulled up in the arrow X2 direction, the arm member 12A further turns in the arrow R7 direction to abut on the maximum diameter part on the outer surface of the drink container 20. The reference symbol C3 in FIG. 19 indicates imaginary lines showing the arm member positions in FIG. 18.

In the state in FIG. 19, the abutting point P between the outer surface of the arm member 12A and the outer surface of the drink container 20 is in the vicinity of the maximum diameter part of the drink container 20. After this point in time, in the process of pulling up the drink container 20 in the arrow X2 direction, the force in the arrow Y3 direction as illustrated in FIG. 18 is not generated at the abutting point P. This is because the outer surface of the drink container 20 varies in shape from the maximum diameter D1 part and is gradually narrowed (in an arrow Y5 direction in FIG. 19), after this point in time. Due to this shape, the body 11A stops turning in the arrow R8 direction (refer to FIG. 18) at this point in time.

When the drink container 20 is continuously pulled up in the arrow X2 direction, movement of the abutting point P is changed to movement in the arrow Y5 direction in FIG. 19. Then, the body 11A receives the biasing force of the helical torsion spring 13 and gradually turns around the center axis Ax1 of the first support shaft 11a, in the upward direction in FIG. 19.

Figure 21:
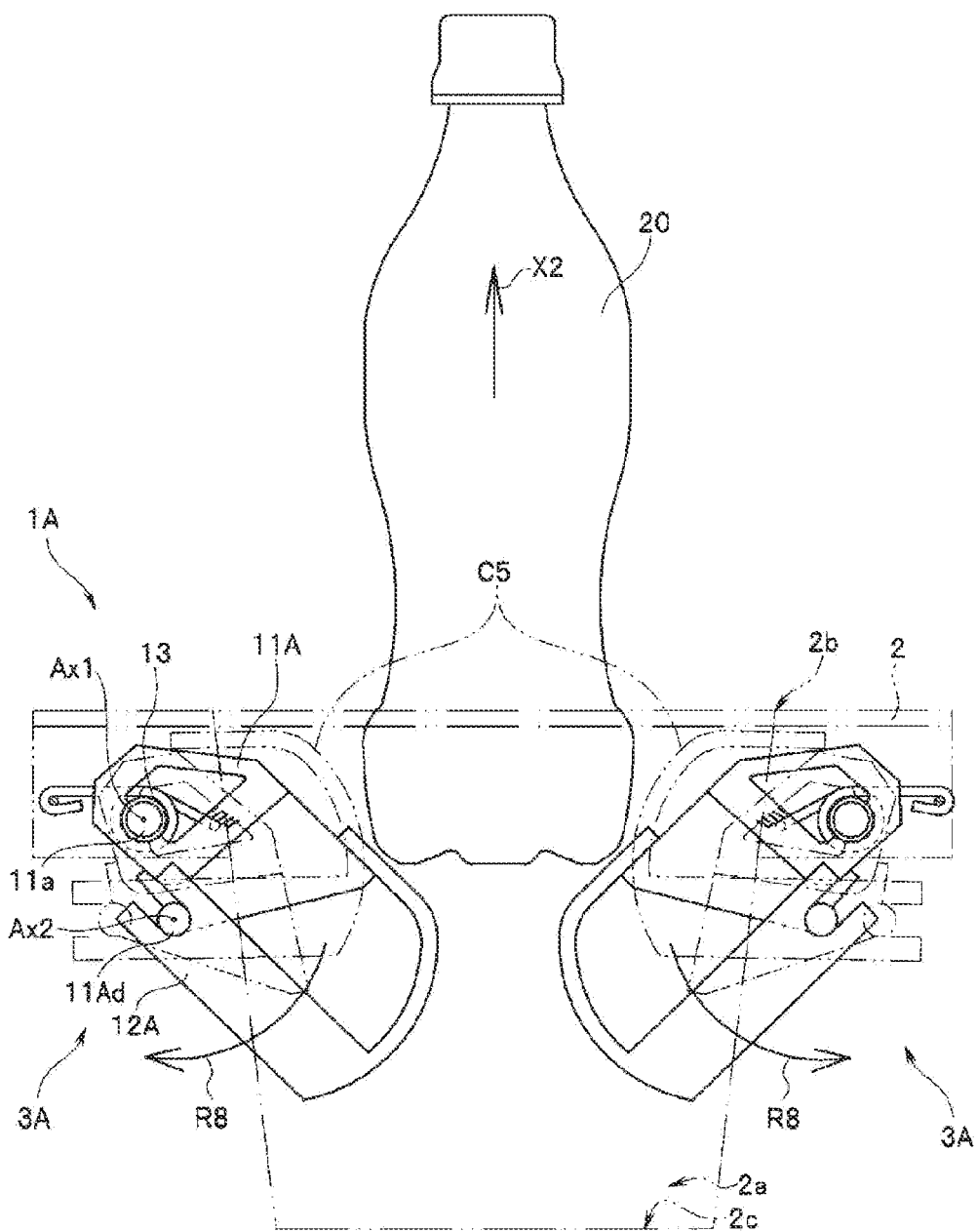
FIG. 21 illustrates a state in which the drink container has been completely pulled up and the container holder has returned to the initial state, following the state in FIG. 20.

When the drink container 20 is further pulled up in the arrow X2 direction, the body 11A returns to the initial state illustrated in FIG. 21 (also refer to the state in FIG. 13). The arm member 12A at this point in time still abuts on the outer surface of the drink container 20 and turns in the arrow R7 direction.

Figure 20:
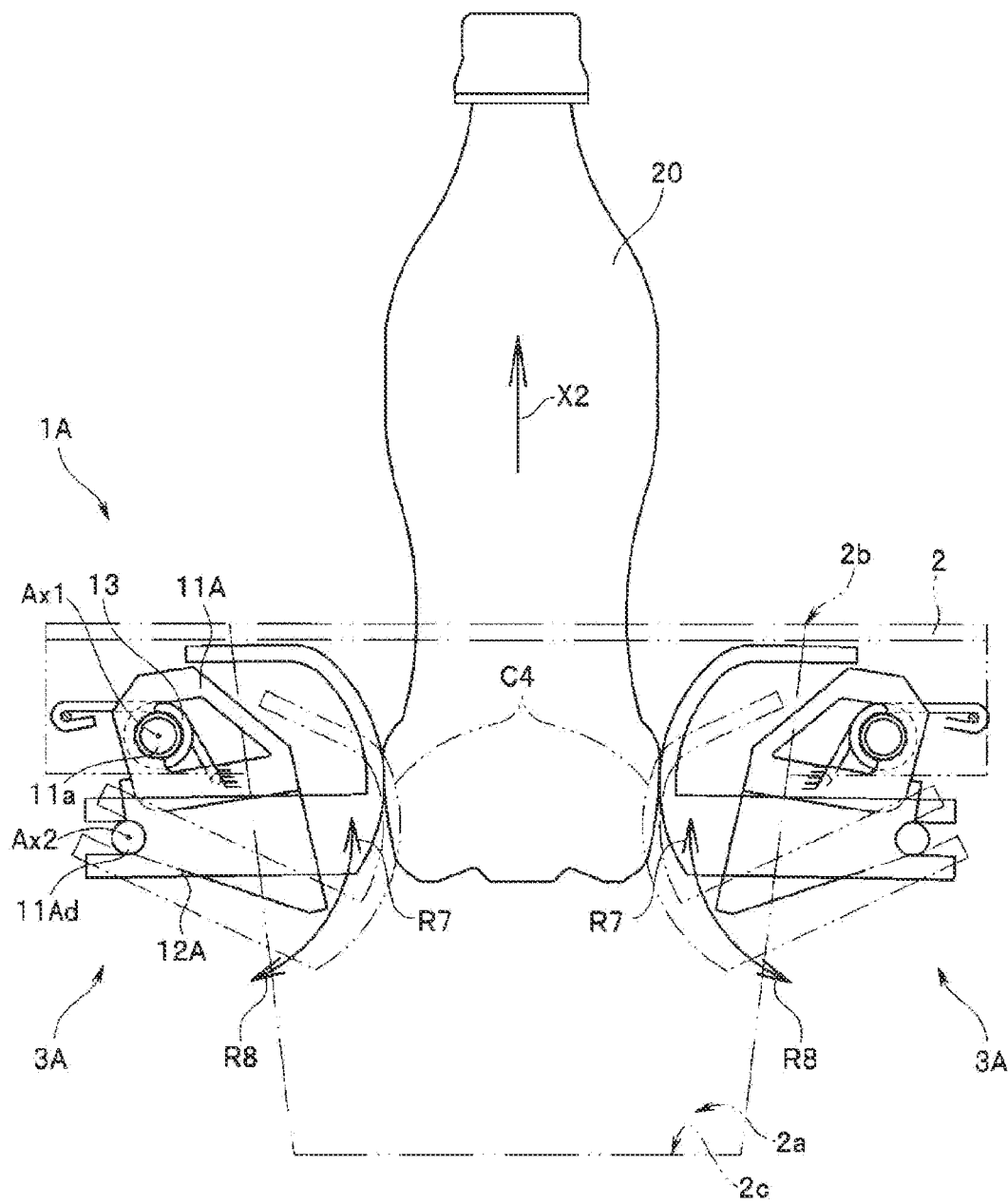
FIG. 20 illustrates a state immediately before abutting between the drink container and the container-holding mechanism is released, following the state in FIG. 19.

FIG. 20 illustrates a state immediately before abutting between the drink container 20 and the container-holding mechanism 3A is released due to pulling up the drink container following the state in FIG. 19. In the situation illustrated in FIG. 20, after the arm 12Ab of the arm member 12A has passed the maximum diameter D1 part of the drink container 20, the arm member 12A further turns in the arrow R7 direction in accordance with movement in the arrow X2 direction of the drink container while maintaining the abutting state. The reference symbol C4 in FIG. 20 indicates imaginary lines showing the arm member positions in FIG. 19.

When the drink container 20 in the state in FIG. 20 is further pulled up in the arrow X2 direction, abutting between the arm member 12A and the outer surface of the drink container is released. This causes the arm member 12A to turn in the arrow R8 direction in FIGS. 20 and 21, under its own weight. Then, the container holder 1A and the drink container 20 return to the initial states illustrated in FIG. 21 (which is the same as the states illustrated in FIG. 13).

FIG. 21 illustrates a state in which the drink container has been completely pulled up and the container holder 1A has returned to the initial state, following the state in FIG. 20. The reference symbol C5 in FIG. 21 indicates imaginary lines showing the arm member positions in FIG. 20.

In this embodiment, approximately the same actions are performed even by using a drink container having a shape different from the first type drink container 20, for example, a drink container having a different diameter such as the second type drink container 20A.

The maximum diameter of a drink container that can be used in the container holder 1A of this embodiment is specified by, for example, the distance between the arm members 12A at the time the pair of the body 11A and the arm member 12A turn together in the arrow R5 direction (refer to FIG. 13) in each container-holding mechanism 3A. In some embodiments, the minimum diameter of a drink container that can be used is, for example, the distance between the arm members 12A of the container-holding mechanisms 3A in the initial state (Wr×2).

As described above, the second embodiment provides effects approximately the same as those provided by the first embodiment. In this embodiment, even if the constituent member of the container-holding mechanism 3A catches the outer surface of the drink container 20 that is being pulled up, the arm member 12A turns to release the caught outer surface of the drink container 20 in accordance with an ordinary taking-out operation, without causing a user to pay attention. Thus, a user hardly feels unnecessary stress in putting in and taking out the drink container.

As described above, the structure of the disclosure can be used for various types of drink containers and the like having different dimensions and shapes and can continuously stably hold the contained drink container or the like. In addition, a part of the container-holding mechanism and so on does not catch an outer surface of a drink container or the like in putting and taking it in and out. Even if a part of the container-holding mechanism and so on catches an outer surface of a drink container or the like, the caught outer surface of the drink container or the like is released simply by an ordinary putting-in operation or an ordinary taking-out operation. Thus, it is possible to easily and smoothly put in and take out each type of drink container or the like in single operation.

The disclosure is not limited to the foregoing embodiments, and of course, various alterations, modifications, and applications can be made within the scope not departing from the gist of the disclosure. Moreover, the above-described embodiments include disclosures in various levels of stages, and each type of disclosure can be derived by appropriately combining the elements disclosed herein. For example, when the problems to be solved by the disclosure are solved and the effects of the disclosure are obtained even if some elements are removed from all elements described in relation to the foregoing embodiment, the structure or the configuration from which some elements are removed can be derived as a disclosure. Furthermore, elements of different embodiments may be used together as appropriate. This disclosure is not limited by specific embodiments described in order to explain the accompanying claims, but it is limited by the accompanying claims.

The invention claimed is:

1. A container holder configured to hold a container, the container holder comprising:
    a holder body comprising a container receiver configured to contain the container, the container receiver having an opening at an upper surface and comprising a bottom surface; and
    a container-holding mechanism configured to stably hold the container that is contained in the container receiver, the container-holding mechanism comprising:
    a swing member that is swingable around a first support shaft relative to the holder body;
    a turning member that is turnable around a second support shaft relative to the swing member; and
    a first biasing member configured to bias the swing member in a direction protruding to a radial inside of the container receiver, wherein
    an outer surface of the container is configured to, while putting or taking the container in or out of the container receiver, abut on a part of an outer surface of the swing member or a part of an outer surface of the turning member, and
    the swing member is configured to swing around the first support shaft or the turning member turns around the second support shaft.

2. The container holder according to claim 1, further comprising:
    a pressing support member axially supporting the turning member in a rotatable manner, the pressing support member being configured to move the turning member in a radial direction of the container receiver; and
    a second biasing member configured to bias the pressing support member in a radially inward direction of the container receiver, wherein
    the turning member comprises a roller that is axially supported so as to be rotatable around the second support shaft.

3. The container holder according to claim 2, wherein, the roller is configured to, when the container is put in the container receiver, rotate in contact with the outer surface of the container and move together with the pressing support member in a retracting direction in a radially outward direction of the container receiver, against a biasing force of the second biasing member.

4. The container holder according to claim 1, wherein the swing member comprises a sloped surface extending from a vicinity of a rim part of the opening of the container receiver toward a radial inside of the opening and extending toward the bottom surface, and
    the sloped surface is configured to, when the container is put in the container receiver, abut on the outer surface of the container and cause the swing member to swing in accordance with movement of the container to the bottom surface.

5. The container holder according to claim 1, wherein the turning member comprises an arm member that comprises a circular arc-shaped part and is axially supported so as to be turnable around the second support shaft, and
    the arm member is configured to, when the container is taken out of the container receiver, turn around the second support shaft, separately from the swing member, in accordance with movement of the container.

* * * * *